(12) United States Patent
Kaneko

(10) Patent No.: US 6,810,177 B2
(45) Date of Patent: Oct. 26, 2004

(54) ARRAY WAVEGUIDE GRATING, OPTICAL TRANSMITTER AND OPTICAL COMMUNICATION SYSTEM WITH MONITORING FUNCTION

(75) Inventor: Tarou Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 420 days.

(21) Appl. No.: 09/987,633

(22) Filed: Nov. 15, 2001

(65) Prior Publication Data

US 2002/0057875 A1 May 16, 2002

(30) Foreign Application Priority Data

Nov. 16, 2000 (JP) ..................................... 2000-348871

(51) Int. Cl.[7] .............................................. G02B 6/34
(52) U.S. Cl. ......................................... 385/37; 385/14
(58) Field of Search ............................. 385/14, 15, 24, 385/37, 46, 100, 31; 359/566, 569

(56) References Cited

U.S. PATENT DOCUMENTS 6,404,946 B1 * 6/2002 Nakajima et al. ............. 385/24

FOREIGN PATENT DOCUMENTS

| JP | 9-49937 | 2/1997 |
|---|---|---|
| JP | 09-289348 | 11/1997 |
| JP | 10-303815 | 11/1998 |

* cited by examiner

Primary Examiner—Frank G. Font
Assistant Examiner—Vincent P Barth
(74) Attorney, Agent, or Firm—McGinn & Gibb, PLLC

(57) ABSTRACT

In arrayed waveguide grating, optical communication system and optical communication system, when monitoring the main signal, it has heretofore been necessary to prepare demultiplexing parts in number corresponding to the number of channels to be monitored. Therefore, with an increase of the channel number the number of parts necessary for monitoring is increased to increase the size of the entire arrayed waveguide grating. In addition, the part number increase leads to the device cost Increase. Higher order diffraction beams obtained from the wavelength multiplexed diffracted beam obtained in an arrayed waveguide grating from a plurality of different wavelengths are used for monitoring. Thus, it is possible to reduce the number of parts necessary for the monitoring and thus provide an arrayed waveguide grating, an optical transmission system and an optical communication system, which can suppress the size and cost increases as much as possible.

40 Claims, 14 Drawing Sheets

PRIOR ART FIG.25
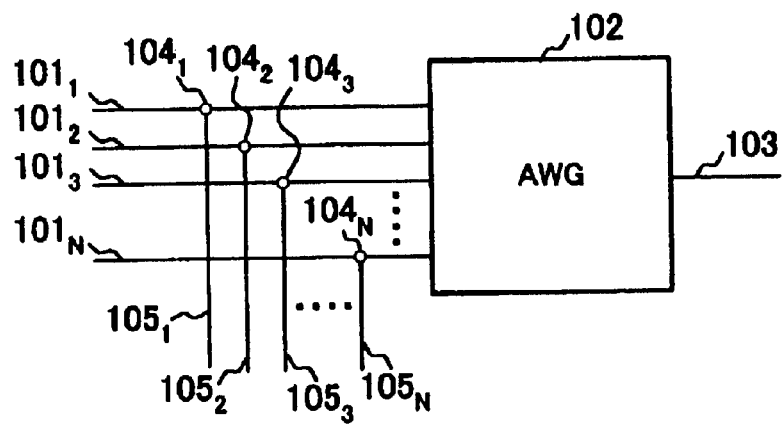
PRIOR ART FIG.26
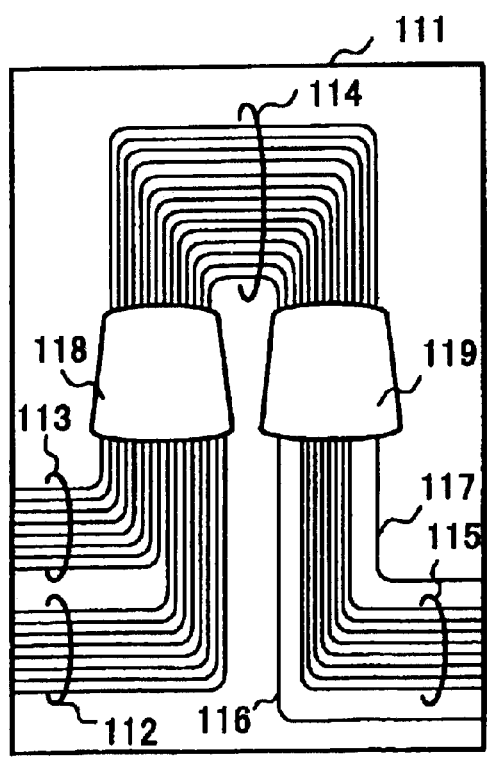

ARRAY WAVEGUIDE GRATING, OPTICAL TRANSMITTER AND OPTICAL COMMUNICATION SYSTEM WITH MONITORING FUNCTION

BACKGROUND OF THE INVENTION

This application claims benefit of Japanese Patent Application No. 2000-348871 filed on Nov. 16, 2000, the contents of which are incorporated by the reference.

The present invention relates to array waveguide grating, optical transmitter and optical communication system with a monitoring function for monitoring signal.

In a DWDM (Dense Wavelength Division Multiplexing) system, for example, alive monitoring and level equalization of signal are required. Accordingly, in such a system couplers or like tapping devices are heretofore provided before or after an AWG (arrayed waveguide grating) to branch signal and monitor the branched signal so as to meet the requirements.

FIG. 25 shows a summary of a prior art synthesizer using a taping device. Signals $101_1$ to $101_N$ of individual wavelengths are inputted to an arrayed waveguide grating 102, and outputted as resultant wavelength multiplexed signal 103 therefrom. On the input side of the arrayed waveguide grating 102, tapping devices $104_1$ to $104_N$ are provided in correspondence to the individual wavelengths for branching the signal to obtain monitoring signals $105_1$ to $105_N$.

In the system using the above synthesizer or array waveguide grating, since the tapping devices $104_1$ to $104_N$ are used for branching signal, it is necessary to prepare such components as couplers and optical fibers for connecting the couplers in number corresponding to the number of monitoring channels. Therefore, with increase of the channel number the number of components necessary for the monitoring is increased, thus leading to size increase of the arrayed waveguide grating as a whole. In addition, the increase of the number of components leads to device cost increase.

Accordingly, Japanese Patent Laid-Open No. 9-49937 proposes an arrayed waveguide grating, in which N input waveguides for wavelength monitoring are provided in addition to N input waveguides for signal inputting, and also output waveguides for wavelength monitoring are provided each for each side of the N output waveguides.

FIG. 26 shows the construction of this arrayed waveguide grating. As shown, on a substrate 111 are formed N input waveguides 112 for signals, N input waveguides 113 for wavelength monitoring signals, a waveguide array 114 of M waveguides having progressively increasing length with a predetermined waveguide length difference ΔL, N output waveguides 115, output waveguides 116 and 117 for wavelength monitoring each provided on each side of the output waveguides 115, an input side slab-waveguide interconnecting the two pairs input waveguides 112 and 113 and the waveguide array 114, and an output side slab-waveguide 119 inter-connecting the waveguide array 114 and the three pairs of output waveguides 115 to 117.

In the proposed array waveguide grating, the N input waveguides 112 connected to the slab-waveguide 118 and the N output waveguides 115 connected to the output side slab-waveguide 119 are used for the signals, while the N input waveguides 113 connected to the input side slab-waveguide 116 and the output waveguides 116 and 117 for wavelength monitoring connected to the output side slab-waveguides 119 are used for the waveguide monitoring. This waveguide grating, therefore, has a drawback that monitoring with the actual signals is impossible.

SUMMARY OF THE INVENTION

An object of the present invention, therefore, is to provide arrayed waveguide grating, optical transmission system and optical communication system, which permits using actual signals to be multiplexed for monitoring these signals and suppressing system size and cost increase as much as possible.

According to a first aspect of the present invention, there is provided an arrayed waveguide grating having a slab-waveguide, the slab-waveguide comprising: a plurality of input ports for inputting signals of different wavelengths in correspondence to these wavelengths; an output port disposed on the focus position of the 0-th order diffraction beams inputted from the input ports for outputting a signal obtained as a result of multiplexing of the individual wavelengths; and a monitor signal port disposed on the focus position of higher order diffraction beams other than the 0-th order obtained from the signals inputted from the input ports for monitoring the multiplexed signal.

In this invention, while outputting the 0-th order diffraction beams obtained from the signals inputted to the slab-waveguide of the arrayed waveguide grating from the output port, the monitor signal port is provided at the focus position of higher order diffraction beams other than the 0-th order, for instance, the 1-st order diffraction beams, for monitoring the wavelength multiplexed signal by using this port.

According to a second aspect of the present invention, there is provided an arrayed waveguide grating having a slab-waveguide, the slab-waveguide comprising: a plurality of input ports for inputting signals of different wavelengths in correspondence to these wavelengths; an output port disposed on the focus position of the 0-th order diffraction beams inputted from the input ports for outputting a signal obtained as a result of multiplexing of the individual wavelengths; and a higher order diffraction beam reflecting means disposed on the focus position of higher order diffraction beams other than the 0-th order obtained from the signals inputted from the input ports for reflecting the higher order diffraction beams to the side of the plurality of input ports.

In this invention, while outputting the 0-th order diffraction beams obtained from the signals inputted to the slab-waveguide of the arrayed waveguide grating, a higher order diffraction beam reflecting means is disposed at the focus position of higher order diffraction beams other than the 0-th order, for instance, the 1-st order diffraction beams, for returning the wavelength multiplexed signal to the side of the input ports. Thus, it is possible to monitor the signals of the different wavelengths obtained as a result of demultiplexing of the signal passed in the reverse direction through the arrayed waveguide grating on the input side thereof.

According to a third aspect of the present invention, there is provided an arrayed waveguide grating having a slab-waveguide, the slab-waveguide comprising: a plurality of input ports for inputting signals of different wavelengths in correspondence to these wavelengths; an output port disposed on the focus position of the 0-th order diffraction beams inputted from the input ports for outputting a signal obtained as a result of multiplexing of the individual wavelengths; a higher order diffraction beam reflecting means disposed on the focus position of higher order diffraction beams other than the 0-th order obtained from the signals inputted from the input ports for reflecting the higher order diffraction beams to the side of the plurality of input ports; and one or more monitor signal ports disposed at a position or positions other than the plurality of input ports for taking out a signal or signals reflected from the higher order diffraction beam reflecting means.

In this invention, while outputting the 0-th order diffraction beams of the signals inputted to the slab-waveguide of the arrayed waveguide grating, a higher order diffraction beam reflecting means is disposed at the focus position of higher order diffraction beams other than the 0-th order, for instance the 1-st order diffraction beams, for returning the wavelength multiplexed signal to the side of the input ports. On the input side, one or more monitor signal ports are disposed, and thus a monitor signal or monitor signals can be obtained from the monitor signal port or ports.

According to a fourth aspect of the present invention, there is provided an optical transmission system comprising: an output side slab-waveguide including, a plurality of signal sources each provided for each individual wavelength, an input waveguide for inputting signals of different wavelengths from these signal sources in correspondence to these wavelengths, a channel waveguide array having waveguides with lengths progressively increasing by a predetermined waveguide length difference, an input side slab-waveguide inter-connecting the input side of the channel waveguide array and the input waveguide, and an output port connected to the output side of the channel waveguide array and disposed at the focus position of the 0-th order diffraction beams inputted from the input waveguides through the input side slab-waveguide and the channel waveguide array for outputting a wavelength multiplexed signal; an output waveguide connected to the output port for outputting the multiplexed signal to be transmitted; a monitor signal separating means for demultiplexing, by using the channel waveguide array, the multiplexed signal obtained in the output side slab-waveguide at the focus position of higher order diffraction beams other than the 0-th order obtained from the signals from the input waveguide, thereby separating the monitor signals of wavelengths corresponding to those of the signals inputted from the input waveguides; an output level detecting means for detecting, from the signals of different wavelengths obtained from the monitor signal separating means, the output levels of the individual wavelength signals from the plurality of signal sources; and a signal source power control means for controlling the power levels of the plurality of signal sources according to the output levels of the individual wavelength signals from the plurality of signal sources as detected by the output level detecting means.

In this invention, while outputting the wavelength multiplexed signal for transmission from the output waveguide, the monitor signal separating means demultiplexes, by using the channel waveguide array, the wavelength multiplexed signal obtained in the output side slab-waveguide at the focus position of higher order diffraction beams other than the 0-th order obtained from the signals from the input waveguide, thereby separating monitor signals of wavelengths corresponding to those of the signals inputted from the input waveguides. The output levels of the signals of the different wavelengths corresponding to those of the plurality of signal sources are detected from the separated individual wavelength signal signals, and the power levels of the plurality of the signal sources are controlled according to the detected output levels of the different wavelength signals of the plurality of signal sources.

According to a fifth aspect of the present invention, there is provided an optical transmission system comprising: a plurality of signal sources each provided for each individual wavelength; an input waveguide for inputting signals of different wavelengths from these signal sources in correspondence to these wavelengths; a channel waveguide array having waveguides with lengths progressively increasing by a predetermined waveguide length difference; an input side slab-waveguide inter-connecting the input side of the channel waveguide array and the input waveguide; an output side slab-waveguide including an output port connected to the output side of the channel waveguide array and disposed at the focus position of the 0-th order diffraction beams inputted from the input waveguides through the input side slab-waveguide and the channel waveguide array for outputting a wavelength multiplexed signal and a monitor signal port disposed at the focus position of higher order diffraction beams other than the 0-th order obtained from the signals inputted from the input waveguide; an output waveguide connected to the output port for outputting the multiplexed signal to be transmitted; a monitor signal separating means for demultiplexing, by using the channel waveguide array, the individual wavelength monitor signals from the wavelength multiplexed signal obtained from the monitor port; an output level detecting means for detecting, from the signals of individual wavelengths obtained from the monitor signal separating means, the output levels of the individual wavelength signal signals from the plurality of signal sources; and a signal source power control means for controlling the power levels of the plurality of signal sources according to the output levels of the individual wavelength signals from the plurality of signal sources as detected by the output level detecting means.

In this invention, while outputting the wavelength multiplexed signal for transmission from the output waveguide, the monitor signal separating means separates the higher order diffraction beam signals other than the 0-th order obtained from the signals inputted from the input waveguides from the monitor signal port disposed on the output side slab-waveguide at the focus position of the diffracted signals. The obtained wavelength multiplexed signal is demultiplexed by using the channel waveguide array to obtain the monitor signals of the individual wavelengths. The output levels of the individual wavelength signals of the plurality of signal sources are detected from the obtained signals of the individual wavelengths, and the power levels of the plurality of signal sources are controlled according to the detected output levels of the individual wavelength signals of the plurality of signal sources.

According to a sixth aspect of the present invention, there is provided an optical transmission system comprising: an input waveguide for inputting signals of different wavelengths in correspondence to these wavelengths; a channel waveguide array having waveguides with lengths progressively increasing by a predetermined waveguide length difference; an input side slab-waveguide inter-connecting the input side of the channel waveguide array and the input waveguide; an output side slab-waveguide including an output port connected to the output side of the channel waveguide array and disposed at the focus position of the 0-th order diffraction beams inputted from the input waveguides through the input side slab-waveguide and the channel waveguide array for outputting a wavelength multiplexed signal; an output waveguide connected to the output port for outputting the multiplexed signal to be transmitted; a monitor signal separating means for demultiplexing, by using the channel waveguide array, the multiplexed signal obtained at the focus position of higher order diffraction beam other than 0-th order of the multiplexed signals inputted from the input waveguide in the output slab-waveguide to obtain the individual wavelength monitor signals; an output level detecting means for detecting, from the signals of individual wavelengths obtained from the monitor signal separating means, the output levels of the individual wavelength; and a signal incidence level control means for controlling the incidence levels of the individual wavelength signals incident on the plurality of input waveguides according to the output levels of the individual wavelength signals as detected by the output level detecting means.

In this invention, while outputting the wavelength multiplexed signal for transmission from the output waveguide, the monitor signal separating means demultiplexes, by using the channel waveguide array, the wavelength multiplexed signal obtained in the output side slab-waveguide at the focus position of the higher order diffraction beam signals other than the 0-th order obtained from the signals obtained from the input waveguides, thus obtaining the monitor signals of the individual wavelengths. The output levels of the individual wavelength signals of the plurality of signal sources are detected from the obtained signal signals of the individual wavelengths, and the power levels of the plurality of signal sources are controlled according to detected output levels of the individual wavelength signals of the plurality of signal sources. This case of the invention is applicable not only to the signals obtained from the signal sources but also to relayed signals.

According to a seventh aspect of the present invention, there is provided an optical transmission system comprising: a plurality of input waveguides for inputting signals of different wavelengths in correspondence to these wavelengths; a channel waveguide array having waveguides with lengths progressively increasing by a predetermined waveguide length difference; an input side slab-waveguide inter-connecting the input side of the channel waveguide array and the input waveguide; an output side slab-waveguide including an output port connected to the output side of the channel waveguide array and disposed at the focus position of the 0-th order diffraction beams inputted from the input waveguides through the input side slab-waveguide and the channel waveguide array for outputting a wavelength multiplexed signal and a monitor signal port disposed at the focus position of higher order diffraction beams other than the 0-th order obtained from the signal inputted from the input waveguide; an output waveguide connected to the output port for outputting the multiplexed signal to be transmitted; a monitor signal separating means for demultiplexing or separating, by using the channel waveguide array, the wavelength multiplexed signal obtained from the monitor port to obtain the individual wavelength monitor outputs; an output level detecting means for detecting, from the signals of individual wavelengths obtained from the monitor signal separating means, the output levels of the individual wavelength; and a signal incidence control means for controlling the incidence levels of the individual wavelength signals incident on the plurality of input waveguides according to the output levels of the individual wavelength signals as detected by the output level detecting means.

In this invention, while outputting the wavelength multiplexed signal for transmission from the output waveguide, the monitor signal separating means separates the higher order diffraction beam signals other than the 0-th order obtained from the signals inputted from the input waveguides from the output port disposed in the output side slab-waveguide at the focus position of the diffracted beams.

The wavelength multiplexed signal thus obtained is demultiplexed by using the channel waveguide array to obtain the monitor signals of the individual wavelengths. The output levels of the signals of the individual wavelengths are detected from the obtained individual wavelength signals, and the power levels of the plurality of signal sources are controlled according to the detected output levels of the individual wavelength signals. This case of the invention is applicable not only to the signals obtained from the signal sources but also to relayed signals.

According to an eighth aspect of the present invention, there is provided an optical transmission system comprising: an input waveguides for inputting signals of different wavelengths in correspondence to these wavelengths; a channel waveguide array having waveguides with lengths progressively increasing by a predetermined waveguide length difference; an input side slab-waveguide inter-connecting the input side of the channel waveguide array and the input waveguide; an output side slab-waveguide, including an output port connected to the output side of the channel waveguide array and disposed at the focus position of the 0-th order diffraction beams inputted from the input waveguides through the input side slab-waveguide and the channel waveguide array for outputting a wavelength multiplexed signal; an output waveguide connected to the output port for outputting the multiplexed signal to be transmitted; and a monitor signal separating means for demultiplexing or separating, by using the channel waveguide array, the multiplexed signal obtained at the focus position of higher order diffraction beam other than 0-th order of the multiplexed signals inputted from the input waveguide in the output slab-waveguide to obtain the individual wavelength monitor signal outputs.

In this invention, the wavelength multiplexed signal obtained in the output side slab-waveguide at the focus position of the higher order diffraction beam signals other than the 0-th order obtained from the signals inputted from the input waveguides are demultiplexed, thus obtaining the monitor signals of the individual wavelengths.

According to a ninth aspect of the present invention, there is provided an arrayed waveguide grating comprising: an input waveguides for inputting signals of different wavelengths in correspondence to these wavelengths; a channel waveguide array having waveguides with lengths progressively increasing by a predetermined waveguide length difference; an input side slab-waveguide inter-connecting the input side of the channel waveguide array and the input waveguides and having monitor signal ports for monitoring signals returning from the channel waveguide array; an output side slab-waveguide including an output side slab-waveguide including an output port connected to the output side of the channel waveguide array and disposed at the focus position of the 0-th order diffraction beams inputted from the input waveguides through the input side slab-waveguide and the channel waveguide array for outputting a wavelength multiplexed signal and a signal returning means for causing a signal converged on the focus position of higher order diffraction beams other than the 0-th order obtained from the signals inputted from the input waveguides to return from the focus position to the input side; and an output waveguide connected to the output port for obtaining the multiplexed signal.

In this invention, the output side slab-waveguide includes the output port for outputting the wavelength multiplexed signal signals at the focus position of the 0-th diffraction beams inputted from the input waveguides and a signal returning means for returning the signal is converged on the focus position of the higher order diffraction beams other than the 0-th order inputted from the input waveguides from the focus position to the input side, and the monitor signal returned through the channel waveguide array to the input side slab-waveguide is taken out from the monitor signal.

According to a tenth aspect of the present invention, there is provided the arrayed waveguide grating according to the ninth aspect, wherein the signal returning means is a reflecting means disposed at the focus position of higher order diffraction beams other than the 0-th order obtained from the signals inputted from the input waveguides for reflecting the higher order diffraction beams to the side of the plurality of input waveguides.

In this invention, a reflecting means such as a mirror is used as the signal returning means.

According to an eleventh aspect of the present invention, there is provided an arrayed waveguide grating comprising: a substrate; input waveguides disposed on the substrate for inputting signals of individual wavelengths in correspondence thereto; a channel waveguide grating disposed on the substrate and having waveguides with lengths progressively increasing by a predetermined waveguide length difference; an input side slab-waveguide disposed on the substrate and inter-connecting the input side of the channel waveguide array and the input waveguides; an output side slab-waveguide connected to the output side of the channel waveguide array and disposed at the focus position of the 0-th diffraction beams obtained from the signals inputted from the input waveguides through the input side slab-waveguide and the channel waveguide array for outputting a wavelength multiplexed signal and a monitor signal port disposed at the focus position of higher order diffraction beams other than the 0-th order obtained from the signals inputted from the input waveguides; an output waveguide connected to the output port; a waveguide disposed on the substrate and having one terminal connected to the monitor signal port of the output side slab-waveguide and the other terminal disposed on the inner side of one end face of the substrate; and a reflecting means disposed at the other terminal of the waveguide for reflecting the signal led out from the monitor signal port.

In this invention, the monitor signal taken out from the output waveguide is reflected and returned by the reflecting means such as a mirror provided on the waveguide on the substrate.

According to a twelfth aspect of the present invention, there is provided an arrayed waveguide rating comprising: a substrate; input waveguides disposed on the substrate for inputting signals of individual wavelengths in correspondence thereto; a channel waveguide grating disposed on the substrate and having waveguides with lengths progressively increasing by a predetermined waveguide length difference; an input side slab-waveguide disposed on the substrate and inter-connecting the input side of the channel waveguide array and the input waveguides; an output side slab-waveguide connected to the output side of the channel waveguide array and having a wavelength multiplexed signal output port disposed at the focus position of the 0-th diffraction beams obtained from the signals inputted from the input waveguides through the input side slab-waveguide and the channel waveguide array, a monitor signal output port disposed at the focus position of the 0-th order diffraction beams obtained from the signals inputted from the input waveguides and a monitor signal input port for outputting an output from a predetermined path, through which the signal outputted from the monitor signal output port returns, toward the plurality of input waveguides; an output waveguide connected to the output port; and a waveguide disposed on the substrate and optically connecting the monitor signal output port and monitor signal input port.

In this invention, the monitor signals taken out from the output waveguide is returned by the waveguide itself on the substrate.

According to a thirteenth aspect of the present invention, there is provided an arrayed waveguide grating comprising: a substrate; input waveguides disposed on the substrate for inputting signals of individual wavelengths in correspondence thereto; a channel waveguide grating disposed on the substrate and having waveguides with lengths progressively increasing by a predetermined waveguide length difference; an input side slab-waveguide disposed on the substrate and inter-connecting the input side of the channel waveguide array and the input waveguides; an output side slab-waveguide connected to the output side of the channel waveguide array and having a wavelength multiplexed signal output port disposed at the focus position of the 0-th diffraction beams obtained from the signals inputted from the input waveguides through the input side slab-waveguide and the channel waveguide array, and a monitor signal port disposed at the focus position of the 0-th order diffraction beams obtained from the signals inputted from the input waveguides; an output waveguide connected to the output port; a waveguide disposed on the substrate and having one terminal connected to the monitor signal port of the output side slab-waveguide and the other terminal disposed on one end face of the substrate; and a reflecting means disposed on the other terminal of the waveguide for reflecting the signal led out from the monitor signal port.

In this invention, the monitor signal taken out from the output waveguide is led through the waveguide up to the end face of the substrate, and then returned by the reflecting means disposed on this end face.

According to a fourteenth aspect of the present invention, there is provided an arrayed waveguide grating comprising: a substrate; input waveguides disposed on the substrate for inputting signals of individual wavelengths in correspondence thereto; a channel waveguide grating disposed on the substrate and having waveguides with lengths progressively increasing by a predetermined waveguide length difference; an input side slab-waveguide disposed on the substrate and inter-connecting the input side of the channel waveguide array and the input waveguides; an output side slab-waveguide connected to the output side of the channel waveguide array and having a wavelength multiplexed signal output port disposed at the focus position of the 0-th diffraction beams obtained from the signals inputted from the input waveguides through the input side slab-waveguide and the channel waveguide array, a monitor signal output port disposed at the focus position of the 0-th order diffraction beams obtained from the signals inputted from the input waveguides and a monitor signal input port for outputting an output from a predetermined path, through which the signal outputted from the monitor signal output port returns, toward the plurality of input waveguides; a monitor signal output waveguide disposed on the substrate and having one terminal connected to the monitor signal port of the output side slab-waveguide and the other terminal disposed on one end face of the substrate; a monitor signal input waveguide disposed on the substrate and having one terminal connected to the monitor signal input port in the output side slab-waveguide and the other terminal disposed at a position other than the afore-mentioned predetermined position on the end face of the substrate; and an optical fiber for optically inter-connecting the monitor signal output waveguide at one end of the substrate and the corresponding terminal of the monitor signal input waveguide.

In this invention, the monitor signal taken out from the output waveguide is led through the output waveguide up to the end face of the substrate, so that it is inputted to the optical fiber connected to the end face from one terminal of the optical fiber and thence returned through the substrate end face and the monitor signal input waveguide to the output side slab-waveguide.

According to a fifteenth aspect of the present invention, there is provided an arrayed waveguide grating comprising: a substrate; input waveguides disposed on the substrate for inputting signals of individual wavelengths in correspondence thereto; a channel waveguide grating disposed on the substrate and having waveguides with lengths progressively increasing by a predetermined waveguide length difference; an input side slab-waveguide disposed on the substrate and inter-connecting the input side of the channel waveguide array and the input waveguides; an output side slab-waveguide connected to the output side of the channel waveguide array and having a wavelength multiplexed signal output port disposed at the focus position of the 0-th diffraction beams obtained from the signals inputted from the input waveguides through the input side slab-waveguide and the channel waveguide array, and a monitor signal port disposed at the focus position of the 0-th order diffraction beams obtained from the signals inputted from the input waveguides; an output waveguide disposed on the substrate and having one terminal connected to the monitor signal port of the output side slab-waveguide and the other terminal disposed on a predetermined position of the substrate; an optical fiber having one terminal connected to the aforementioned other terminal of the output waveguide located on the end face of the substrate; and a reflecting means connected to the other terminal of the optical fiber for reflecting the signal led out from that other terminal.

In this invention, the monitor signal taken out from the output waveguide is led through the output waveguide up to the end face of the substrate and inputted to the optical fiber connected to the end face from one terminal of the optical fiber. The other terminal of the optical fiber is connected to the reflecting means reflecting the signal led from one end of the optical fiber. Thus, it is possible to return the wavelength multiplexed monitor signal to the output side slab-waveguide.

According to a sixteenth aspect of the present invention, there is provided an arrayed waveguide grating comprising: input waveguides for inputting signals of individual wavelengths in correspondence to these wavelengths; a channel waveguide array having waveguides with lengths progressively increasing by a predetermined waveguide length difference; a feedback waveguide for feeding back a multiplexed signal monitor signal; an input side slab-waveguide, in which the input waveguides and the feedback waveguide are disposed on one side and the input side of the channel waveguide array is disposed on the output side; an output side slab-waveguide connected to the output side of the channel waveguide array and having an output port disposed on the focus position of the 0-th diffraction beams obtained from the signal inputted from the input waveguides through the input side slab-waveguide and the channel waveguide array for outputting the wavelength multiplexed signal, a feedback port disposed at the focus position of higher order diffraction beams other than the 0-th order obtained from the signals inputted from the input waveguides and one or monitor signal ports for outputting monitor signals separated from the multiplexed signal inputted from the feedback waveguide to the channel waveguide array; an output waveguide connected to the output port of the output side slab-waveguide; and monitor signal output waveguide connected to the monitor signal port.

In this invention, the wavelength multiplexed monitor signal obtained from the feedback port of the output side slab-waveguide, is inputted to the input side of the input side slab-waveguide by using the feedback waveguide. Thus, the monitor signal can be demultiplexed through the channel waveguide array and taken out from the monitor signal port of the output side slab-waveguide.

According to a seventeenth aspect of the present invention, there is provided an arrayed waveguide grating comprising: input waveguides for inputting signals of individual wavelengths in correspondence to these wavelengths; a channel waveguide array having waveguides with lengths progressively increasing by a predetermined waveguide length difference; a feedback fiber for feeding back a multiplexed signal monitor signal; an input side slab-waveguide, in which the input waveguides and the feedback fiber are disposed on one side and the input side of the channel waveguide array is disposed on the output side; an output side slab-waveguide connected to the output side of the channel waveguide array and having an output port disposed on the focus position of the 0-th diffraction beams obtained from the signal is inputted from the input waveguides through the input side slab-waveguide and the channel waveguide array for outputting the wavelength multiplexed signal, a feedback port disposed at the focus position of higher order diffraction beams other than the 0-th order obtained from the signals inputted from the input waveguides and one or monitor signal ports for outputting monitor signals separated from the multiplexed signal inputted from the feedback waveguide to the channel waveguide array; an output waveguide connected to the output port of the output side slab-waveguide; and monitor signal output waveguide connected to the monitor signal port.

In this invention, the wavelength multiplexed monitor signal obtained from the feedback port of the output side slab-waveguide, is inputted to the input side of the input side slab-waveguide by using the feedback fiber. Thus, the monitor signal can be demultiplexed through the channel waveguide array and taken out from the monitor signal port of the output side slab-waveguide.

According to an eighteenth aspect of the present invention, there is provided an arrayed waveguide grating comprising: input waveguides for inputting signals of individual wavelengths in correspondence to these wavelengths; monitor waveguides disposed at positions individual from the input waveguides for outputting monitor signals; a channel waveguide array having waveguides with lengths progressively increasing by a predetermined waveguide length difference; an output side slab-waveguide connected to the output side of the channel waveguide array and including a signal returning means for causing a signal converged on the focus position of higher order diffraction beams other than the 0-th order obtained from the signals inputted from the input waveguides through the input side slab-waveguide and the channel waveguide array to return from he focus position to the input side; an input side slab-waveguide inter-connecting the input waveguides, the monitor waveguides and the input side of the channel waveguide array for outputting the signal inputted from the output side slab-waveguide to the channel waveguide array to the monitor signal waveguide; an output port disposed on the output side slab-waveguide at the focus position of the 0-th diffraction beams obtained from the signal inputted from the input waveguides for outputting the wavelength multiplexed signal; and an output waveguide connected to the output port.

In this invention, the monitor signal waveguide is connected in addition to the input waveguides for inputting signals to be multiplexed to the input side of the slab-waveguide. The output side slab-waveguide includes the signal returning means for taking out returned on the input side slab-waveguide side from the monitor signal waveguide. The returned monitor signal is obtained from the port other than the input waveguides (the port being deviated in position from the input waveguides).

According to a nineteenth aspect of the present invention, there is provided the arrayed waveguide grating according to the eighteenth aspect, wherein the monitor waveguide is disposed at the focus position of the 0-th order diffraction beams obtained from the signals returning from the output side slab-waveguide to the input side slab-waveguide, and the focus positions of the 1-st order diffraction beams are disposed at positions mid way between adjacent ones of the input waveguides.

In this invention, the monitor waveguide is provided such that its ports are disposed at the focus positions of the 0-th order diffraction beams obtained from the signals returned to the input side slab-waveguide side. The focus positions of the higher order diffraction beams of the monitor signals are set mid way between adjacent ones of the input ports. Thus, the quantity of the returned signals inputted in the reverse direction to the input waveguides is reduced.

According to a twentieth aspect of the present invention, there is provided the arrayed waveguide grating according to the eighteenth aspect, wherein the monitor waveguides are disposed alternately with the input waveguides at the input side slab-waveguide.

In this invention, the monitor waveguide are disposed between the respective input waveguides, the waveguides are concentrically disposed around the center of the input side slab-waveguide, 0-th order diffraction monitor signal is inputted to the monitor waveguide and the higher order diffraction beams are focused around these waveguides, reducing the monitor signals in the input waveguide.

According to a twenty-first aspect of the present invention, there is provided the arrayed waveguide grating according to the eighteenth aspect, wherein the input positions of the input side slab-waveguide corresponding to the individual wavelengths of the inputs inputted to the input waveguides are disposed mid way between the 0-th and 1-st diffraction beams returning from the channel waveguide array.

In this invention, wherein the monitor waveguides are disposed mid way between adjacent ones of the focus positions of 0-th and 1-st diffraction beams of the monitor signals returning from the channel waveguide array. With the input waveguide positions and the monitor signal focus positions set such that they are deviated from one another, the monitor signals passing through the input waveguides are reduced.

According to a twenty-second aspect of the present invention, there is provided the arrayed waveguide grating according to the eighteenth aspect, wherein a region covering the positions of the monitor signal ports in the input side slab-waveguide is set such that it does not overlap but separate from a region covering the positions of the input ports.

In this invention, the region covering the positions of the monitor signal ports in the input side slab-waveguide is spaced apart from the region covering the positions of the input waveguides for inputting the individual wavelength signals, thus reducing the effects of the monitor signals inputted to the input waveguides.

According to a twenty-third aspect of the present invention, there is provided the arrayed waveguide grating according to the eighteenth aspect, wherein the signal returning means includes a higher order diffraction beam reflecting mirror disposed in the output side slab-waveguide at the focus position of the higher order diffraction beams, and a signal returning mirror disposed at a position other than the position of the higher order diffraction beam reflecting mirror and the focus position of the 0-th order diffraction beams for returning the signals reflected by the higher order diffraction beam mirror to the side of the input side.

In this invention, unlike the case of reflecting the monitor signal by the sole higher order diffraction beam reflecting mirror disposed at the focus position of the higher order diffraction beams, the reflected signal is further reflected by a signal returning mirror disposed as a different mirror at a position other than the focus position of, for instance, the 0-th or the 1-st order diffraction beam signals to the side of the input side slab-waveguide. Thus, it is possible to reduce the effects of the monitor signals inputted to the input waveguides of the input side slab-waveguide in dependence on the difference between the returning positions.

According to a twenty-fourth aspect of the present invention, there is provided the arrayed waveguide grating according to the eighteenth aspect, wherein the signal returning means includes a signal returning mirror disposed in the output side slab-waveguide at the focus position of the higher order diffraction beams for returning the higher order diffraction beams incident on that position along a path at a signal angle from the optical axis to the side of the input side.

In this invention, the signal returning mirror for returning the higher order diffraction beams along a path at a signal angle from the optical axis to the input side is provided. Thus, it is possible to reduce the effects of the monitor signal inputted to the input waveguides of the input side slab-waveguide in dependence on the difference between the returning positions.

According to a twenty-fifth aspect of the present invention, there is provided the arrayed waveguide grating according to the eighteenth aspect, wherein the signal returning means includes a mirror disposed on one end face of a substrate with the output side slab-waveguide, a first monitor signal waveguide for leading the signal converged on the focus position of the higher order diffraction beams to the afore-mentioned mirror, and a second monitor signal waveguide, which causes the signal reflected by the afore-mentioned mirror to be inputted to the output side slab-waveguide from a position thereof other than the output port thereof and the focus position of the higher order diffraction beams other than the 0-th order for being outputted to the side of the input side.

In this invention, the monitor signal taken out from the output side slab-waveguide is led through the first monitor signal waveguide up to the end face of the substrate, and the signal reflected by the mirror disposed at this position is inputted to the input side from a position other than the output port of the output side slab-waveguide and the position of the higher order diffraction beams other than the 0-th order. Thus, the monitor signal inputted to the input waveguide of the input side slab-waveguide is reduced in dependence on the difference of the position, from which the monitor signal is returned.

According to a twenty-sixth aspect of the present invention, there is provided the arrayed waveguide grating according to the eighteenth aspect, wherein the signal returning means a monitor signal waveguide, which the signal converged on the focus position of the higher order diffraction beams is inputted to and causes the inputted to be inputted to the output side slab-waveguide from a position thereof other than the output port thereof and the focus position of the higher order diffraction beams for being outputted to the side of the input side.

In this invention, for realizing the take-out of the signal converged at the focus position of the higher order diffraction beams and the input of the taken-out signal from a position other than the focus position of the higher order diffraction beams other than the 0-th order, the monitor signal waveguide connecting both the ports is disposed on the substrate.

According to a twenty-seventh aspect of the present invention, there is provided the arrayed waveguide grating according to the eighteenth aspect, wherein the signal returning means includes an optical fiber, which the signal converged on the focus position of the higher order diffraction beams is inputted to and causes the input to be inputted to the output side slab-waveguide from a position thereof other than the output port thereof and the focus position of the higher order diffraction beams for being outputted to the side of the input side.

In this invention, the optical fiber is used in lieu of the monitor signal waveguide used in the preceding case of the invention.

According to a twenty-eighth aspect of the present invention, there is provided an optical communication system comprising: an optical communication means for outputting signals of individual wavelengths as parallel signals; a multiplexer constituted by an arrayed waveguide grating for wavelength multiplexing the signals of the individual wavelengths outputted from the optical communication means; an optical transmission path for transmitting the wavelength multiplexed signal outputted from the multiplexer; a node provided on the optical transmission path and including an arrayed waveguide grating; a demultiplexer constituted by an arrayed waveguide grating for separating the individual wavelength signals from the signal inputted through the optical transmission path and the node thereon; an optical reception means for receiving the individual wave signals separated by the multiplexer; and the multiplexer including a plurality of input waveguides for inputting signals of individual wavelengths in correspondence to these wavelengths, and a slab-waveguide having a wavelength multiplexed signal output port disposed at the focus position of the 0-th order diffraction signals of the signals inputted from the input waveguides through an input side slab-waveguide and a channel waveguide array and monitor signal port disposed at the focus position of higher order diffraction beams other than the 0-th order obtained from the signals inputted from the input waveguides or monitoring the wavelength multiplexed signal.

In this invention, in the line-structure optical communication system for control by monitor signal, which comprises the optical communication means, the multiplexer constituted by the arrayed waveguide grating for wavelength multiplexing the signals of the individual wavelengths sent out from the optical communication means, the optical transmission line for the wavelength multiplexed signal outputted from the multiplexer, the node provided on the optical transmission line and including the arrayed waveguide grating disposed thereon at an adequate position, the demultiplexer constituted by the arrayed waveguide grating for demultiplexing the signal led along the signal transmission path and through the node, and the optical receiver for receiving the signal signals of the individual wavelengths separated by the demultiplexer, the demultiplexer as the constituent is constituted by the arrayed waveguide grating as mentioned before in connection with the first-mentioned case of the invention.

According to a twenty-ninth aspect of the present invention, there is provided an optical transmission system comprising a transmission path loop having a plurality of nodes connected to one another by transmission paths such that a wavelength multiplexed signal is sent out to these transmission paths; the nodes each including a first arrayed waveguide grating for separating signals of individual wavelengths from the inputted wavelength multiplexed signal and a second arrayed wavelength waveguide grating for waveguide wavelength multiplexing the separated signals of the individual wavelengths; the second arrayed waveguide grating having a plurality of input waveguides for inputting signals of individual wavelengths in correspondence to these signals, and a slab-waveguide having a wavelength multiplexed signal output port disposed at the focus position of the 0-th diffraction beams obtained from the signals inputted from the input waveguides through an input side slab-waveguide and a channel waveguide array and a monitor signal port disposed at the focus position of higher order diffraction beams other than the 0-th order obtained from the signals inputted from the input waveguides for monitoring the wavelength multiplexed signal.

In this invention, in the loop-structure optical communication system, which comprises the loop transmission line including a plurality of nodes connected to one another by transmission lines to a loop from for inputting the wavelength multiplexed signal to these transmission lines, the nodes each including the first arrayed waveguide grating for demultiplexing the wavelength multiplexed signal to separate the individual wavelength signals and the second arrayed waveguide grating for wavelength multiplexing the separated individual wavelength signals, the second waveguide array is constituted by the arrayed waveguide grating as mentioned before in connection with the first-mentioned invention.

According to a thirtieth aspect of the present invention, there is provided an optical communication system comprising: an optical communication means for outputting signals of individual wavelengths as parallel signals; a multiplexer constituted by an arrayed waveguide grating for wavelength multiplexing the individual wavelength signals outputted from the optical communication means; an optical transmission path for transmitting the wavelength multiplexed signal outputted from the multiplexer; a node disposed on the optical transmission path and including an arrayed waveguide grating; a demultiplexer for demultiplexing the signal inputted thereto along the optical transmission path and on the node thereon to separate the individual wavelength signals; an optical reception means for receiving the separated individual wavelength signals from the demultiplexer; and the demultiplexer including a plurality of input waveguides and a slab waveguide having a wavelength multiplexed signal output port disposed at the focus position of the 0-th order diffraction beams inputted from the input waveguides through an input side slab-waveguide and a channel waveguide array, a higher order diffraction beam reflecting means disposed at the focus position of higher order diffraction beam positions other than the 0-th order obtained from the signals inputted from the input waveguides for reflecting the higher order diffraction beams to the side of the plurality of input waveguides and one or more monitor signal ports disposed at a position or positions other than the ports of the plurality of input waveguides for inputting a signal or signals reflected by the higher order signal reflecting means.

In this invention, in the line-structure optical transmission system, which comprises the optical communication means, the multiplexer constituted by the arrayed waveguide grating for wavelength multiplexing the individual wavelength signals sent out from the optical communication means, the optical transmission line for outputting the wavelength multiplexed signal outputted from the multiplexer, the node including the arrayed waveguide grating disposed one optical transmission line at an adequate position, the demultiplexer constituted by the arrayed waveguide grating for demultiplexing the signal inputted along the optical transmission line and through the node to separate the individual wavelength signals, and the signal receiving means for receiving the individual wavelength signals separated the demultiplexer, the multiplexer as the constituent is constituted by the arrayed waveguide grating as mentioned before in connection with the third-mentioned invention.

According to a thirty-first aspect of the present invention, there is provided an optical communication system comprising a transmission path loop having a plurality of nodes connected to one another by transmission paths such that a wavelength multiplexed signal is sent out to these transmission paths; the nodes each including a first arrayed waveguide grating for separating signals of individual wavelengths from the inputted wavelength multiplexed signal and a second arrayed wavelength waveguide grating for waveguide wavelength multiplexing the separated signals of the individual wavelengths; the second arrayed waveguide grating having a slab-waveguide which includes a plurality of input waveguides for inputting signals of individual wavelengths in correspondence to these signals, a multiplexed signal output port disposed at the focus position of the 0-th diffraction beams obtained from the signals inputted from the input waveguides through an input side slab-waveguide and a channel waveguide array, a higher order diffraction beam reflecting means for reflecting the higher order diffraction beams to the side of the plurality of input waveguides and a plurality of monitor signal ports disposed at positions other than the port positions of the plurality of input waveguides for inputting the signals reflected by the higher order diffraction beams, and a monitor signal port disposed at the focus position of higher order diffraction beams other than the 0-th order obtained from the signals inputted from the input waveguides for monitoring the wavelength multiplexed signal.

In this invention, in the loop-structure optical communication system, which comprises the loop-structure transmission line including a plurality of nodes connected to one another for inputting the wavelength multiplexed signal to these transmission lines, the nodes each including the first arrayed waveguide grating for demultiplexing the wavelength multiplexed signal to separate the individual wavelength signals, and the second arrayed waveguide grating for wavelength multiplexing the separated individual wavelength signals. The second arrayed waveguide grating is constituted by the arrayed waveguide grating as mentioned before in connection with the third-mentioned arrayed waveguide grating.

Other objects and features will be clarified from the following description with reference to attached drawings.

BRIEF DESCRIPTION OF THE DRAWINGS

FIG. 25 shows a prior art synthesizer using a taping device; and

FIG. 26 shows the construction of an arrayed waveguide grating according to the prior art.

PREFERRED EMBODIMENTS OF THE INVENTION

Figure 1:
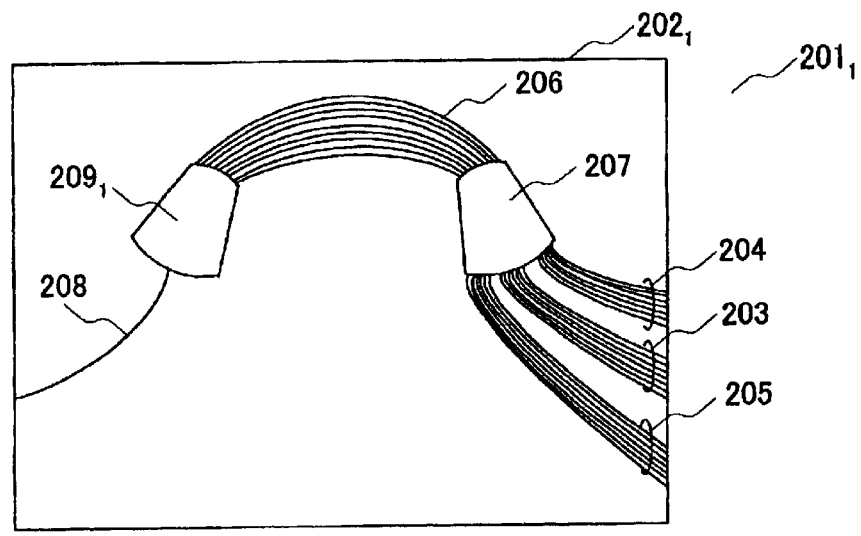
FIG. 1 shows an entire construction of an arrayed waveguide grating as a first embodiment of the present invention.

Preferred embodiments of the present invention will now be described with reference to the drawings. FIG. 1 shows the entire construction of an arrayed waveguide grating as a first embodiment of the present invention. In the illustrated arrayed waveguide grating $202_1$, on a substrate $202_1$ are formed input waveguides 203 for inputting signals, first and second monitor signal output waveguides 204 and 205 disposed adjacent to the input waveguides 203, a channel waveguide array 206 having waveguides with lengths progressively increasing by a predetermined waveguide length difference, an input side slab-waveguide 207 inter-connecting the input waveguides 203, the first and second monitor signal output waveguides 204 and 205 and the channel waveguide array 206, output waveguides 208 for outputting signals, and an output side slab-waveguide $209_1$ inter-connecting the output waveguides 208 and the channel waveguide array 206.

The arrayed waveguide grating $201_1$ shown in FIG. 1, is used as an AWG (arrayed waveguide grating) for MUX (multiplexer) for multiplexing a plurality of signals having different wavelengths and outputting the resultant signal of WDM (Wavelength Division Multiplexing) from the output waveguide 208. As the input waveguides 203 are provided a plurality of waveguides for inputting signals of individual wavelengths. The channel waveguide array 206 has waveguides with lengths thereof progressively increasing by a predetermined waveguide length difference, and outputs the plurality of signals such that these signals reach the output side slab-waveguide $209_1$ with phase differences. Thus, a signal obtained as a result of wavelength multiplexing of the individual signals with the individual wavelengths, is outputted from an output port corresponding to the output waveguide 208 leading from the output side slab-waveguide $209_1$.

In this embodiment, as will be described later, the output side slab-waveguide $209_1$ is adapted to output the 1-st order diffraction beams obtained from the wavelength multiplexed signals as monitor signal back to the side of the channel waveguide array 206. As the monitor signal passes through the channel waveguide array 206 and the input side slab-waveguide 207, it is demultiplexed, whereby the signals of the initial wavelengths are restored. The restored signals are outputted in the reverse direction from the input side slab-waveguide 207 from the output side thereof and inputted to the first and second monitor signal output waveguides 204 and 205 to be outputted as monitor signal signals therefrom.

In this embodiment, the monitor signal output waveguides 204 and 205 are provided in two regions. In this embodiment, monitor signal is taken out for each channel from a higher received monitor signal level one of the two regions. In other words, monitor signal output waveguides corresponding in number to the number of channels to be monitored are disposed in such optimum regions as to increase the minimum received signal level of all the channels. This arrangement, however, is of course by no means limitative; for example, the first and second monitor signal output waveguides 204 and 205 may be adopted such that each of them can receive signals of all the channels. In this case, even if a deficiency took place in manufacture in either one of the two monitor signal output waveguides 204 and 205, the arrayed waveguide grating $201_1$ itself can be used as good product.

Figure 2:
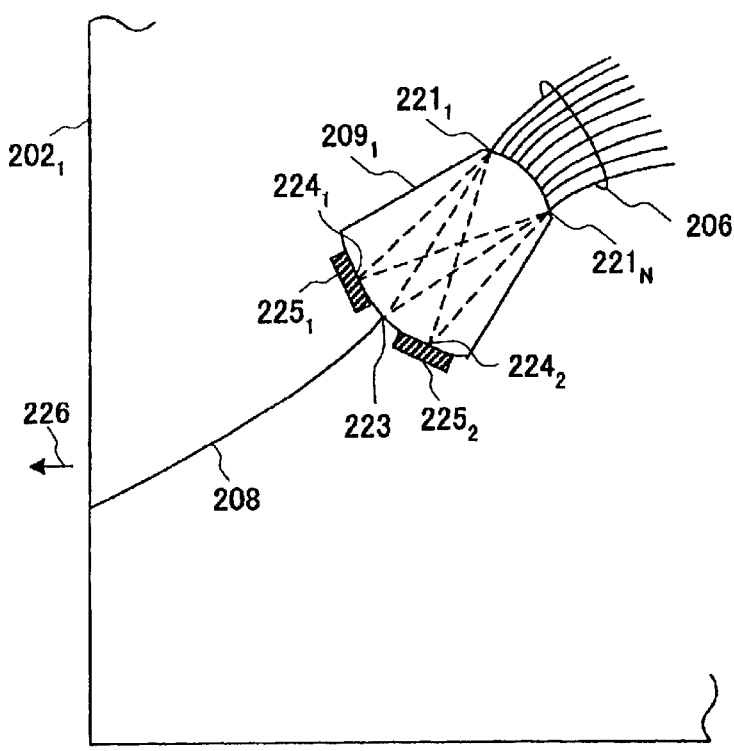
FIG. 2 shows, to an enlarged scale, an output side slab-waveguide and the neighborhood thereof as shown in FIG. 1.

FIG. 2 shows, to an enlarged scale, the output side slab-waveguide and the neighborhood thereof as shown in FIG. 1. As shown, the output side slab-waveguide $209_1$ has a plurality of input ports $221_1$ to $221_N$, to which corresponding ports of the channel waveguide array 206 are connected. Signals of individual wavelengths having passed through the input side slab-waveguide and the channel waveguide array are outputted from the input ports $221_1$ to $221_N$ of the output side slab-waveguide $209_1$. The outputted signals are wavelength multiplexed in the output side slab-waveguide $209_1$ to be focused on the output side end face thereof. The output side slab-waveguide $209_1$ has an output port 223 disposed on the focus position of the 0-th order diffraction beams obtained from the signals. At the output port 223, one terminal of the output waveguide 208 is disposed. At focus positions $224_1$ and $224_2$ of the 1-st order diffraction beams obtained from the signals inputted to the input ports $221_1$ to $221_N$, a first and a second mirror $225_2$ and $225_2$ are disposed such that their reflecting surfaces face the input ports $221_1$ to $221_N$. In this embodiment, the first and second mirrors are disposed in order to elevate the monitor signal intensity level. However, only a single mirror may of course suffice be used so long as the monitor signal is sufficient level.

Thus, a comparatively high intensity level wavelength multiplexed signal is converged on the output port 223 to be outputted as WDM signal through the output waveguide 208 to the outside of the substrate $202_1$. The 1-st order diffraction beams at the focus positions $224_1$ and $224_2$ are usually lower in level than the 0-th order diffraction beams. Although not shown, focus positions of diffracted signals of 2-nd and higher orders are also present, and theoretically it is possible to further use these signals as monitor signals. However, the 2-nd and higher order diffraction beams are lower in level than the 1-st order diffraction beams, and according to the present invention they are not utilized.

The first and second mirrors $225_1$ and $225_2$ reflect the 1-st order diffraction beams as monitor signals. The reflected signals pass in the reverse direction through the output side slab-waveguide $209_1$ and are outputted from the input ports $221_1$ to $221_N$ thereof to the output side of the channel waveguide array 206 and thence pass in the reverse direction to the signal signals passing from the input side slab-waveguide 207 shown in FIG. 1.

As shown in FIG. 1, the first and second monitor signal output waveguides 204 and 205 are disposed on the input side of the input side slab-waveguide 207. From the first and second monitor signal output waveguides 204 and 205, are thus outputted signals of corresponding wavelengths having passed in the reverse direction through the channel waveguide array 206. It is thus possible to maintain optimum intensity levels of the signals constituting the WDM signal 226 by monitoring and adjusting these monitor signals for each wavelength.

Figure 3:
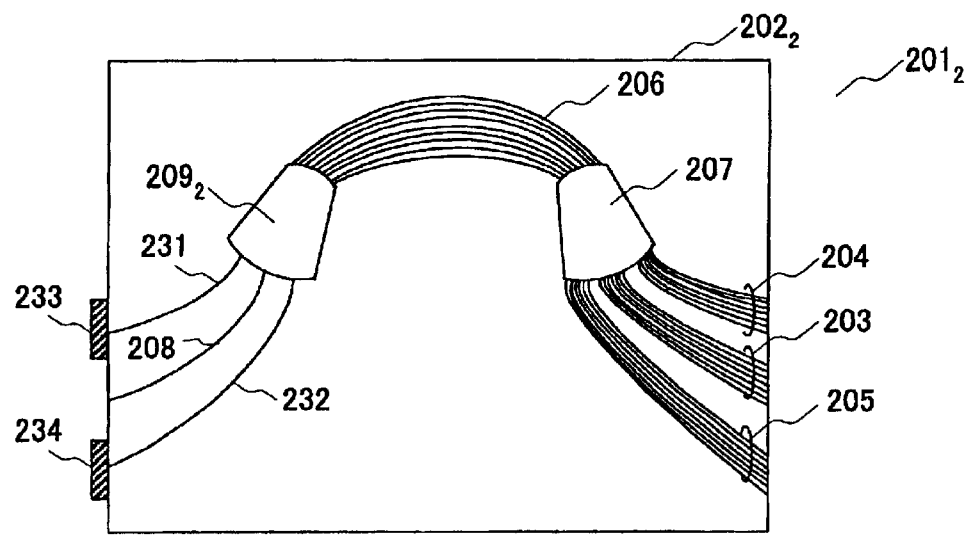
FIG. 3 shows an entire construction of an arrayed waveguide grating as a second embodiment of the present invention.

FIG. 3 shows the entire construction of an arrayed waveguide grating as a second embodiment of the present invention. In FIG. 3, parts like those in the first embodiment shown in FIG. 1 are designated by like reference numerals, and their description is adequately omitted.

In the arrayed waveguide grating $201_2$ as the second embodiment, on a substrate $202_2$ are formed an input waveguides 203 for inputting signals, first and second monitor signal output waveguides 204 and 205 disposed adjacent to the input side waveguides 201, a channel waveguide array 206 having waveguides with lengths progressively increasing by a predetermined waveguide length difference, an input side slab-waveguide 207 inter-connecting the input waveguides 203, the first and second monitor signal output waveguides 204 and 205 and the channel waveguide array 206, output waveguide 208 for outputting signal, a first and a second monitor signal output waveguide 231 and 232 formed on the opposite sides of the output waveguide 208, an output side slab-waveguide $209_2$ inter-connecting the output waveguide 208, the first and second monitor signal waveguides 231 and 232 and the channel waveguide array 206, and a first and a second mirrors 233 and 234 connected to the first and second monitor signal output waveguides 231 and 232 at the terminal thereof opposite the terminal connected the output side slab-waveguide $209_2$. The first and second mirrors 233 and 234 are formed on an end surface of the substrate $202_2$.

Figure 4:
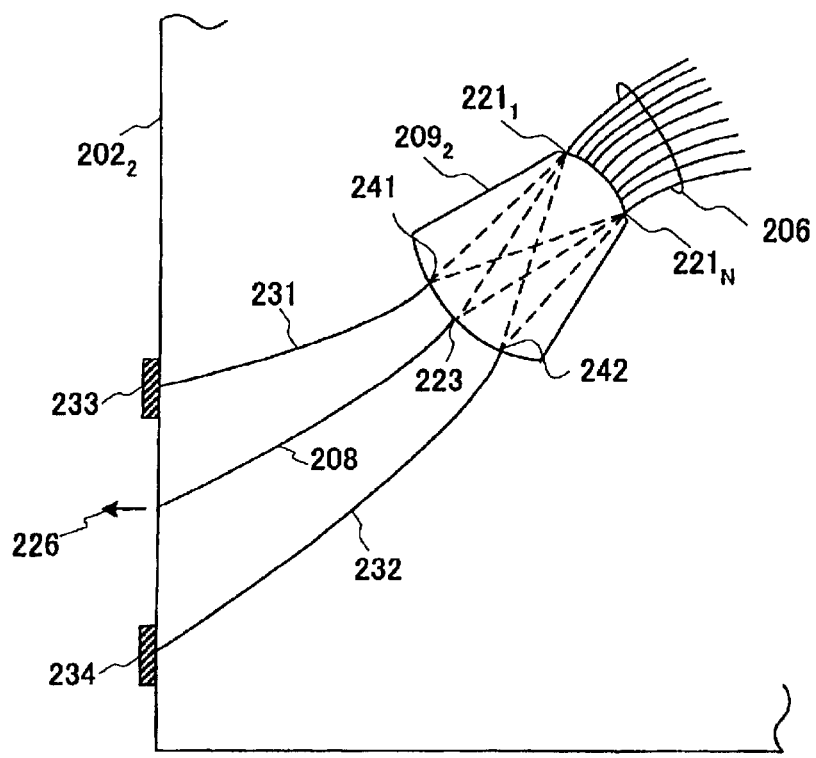
FIG. 4 shows, to an enlarged scale, an output side slab-waveguide and the neighborhood thereof of the array waveguide grating having the above construction.

FIG. 4 shows, to an enlarged scale, the output side slab-waveguide and the neighborhood thereof of the array waveguide grating having the above construction. As shown, the output side slab-waveguide $209_2$ has a plurality of input ports $221_1$ to $221_N$, to which corresponding ports of the channel waveguide array 206 are connected. From the input ports $221_1$ to $221_N$ are outputted signals having passed through the input side slab-waveguide and the channel waveguide array. The outputted signals are multiplexed in the output side slab-waveguide $209_2$ to be focused on the output side end face thereof. The output side slab-waveguide $209_2$ has an output port 223 disposed on the focus position of the 0-th order diffraction beams obtained from the signals. At the output port 223, one terminal of the output waveguide 208 is disposed. The output side slab-wavelength $209_2$ also has a first and a second monitor signal output port 241 and 242 disposed on the focus positions $224_1$ and $224_2$ of the 1-st order diffraction beams obtained from the signals from the input ports $221_1$ to $221_N$. In this embodiment, two, i.e., the first and second, monitor signal output ports are provided in order to elevate the monitor signal intensity level. However, only one of these monitor signal output ports may suffice so long as the monitor signal level is sufficient.

The first monitor signal output waveguide 231 has one terminal connected to the first monitor signal port 241, and its other terminal faces the reflecting surface of the first mirror 232, which is formed by deposition or like means on one end face of the substrate $202_2$. The second monitor signal waveguide 232 has one terminal connected to the second monitor signal port 242, and its other terminal faces the reflecting surface of the second mirror 234, which is likewise formed by deposition or like means on the end face of the substrate $202_2$. The first and second mirrors 233 and 234 may be produced in a separate place and mounted on the end face of the substrate $202_2$.

In the arrayed waveguide grating $201_2$ as the second embodiment having the above construction, when a plurality of signals of individual wavelengths are inputted from the input waveguide 203, the channel waveguide array 206 having waveguides with wavelengths thereof progressively increasing by a predetermined waveguide length difference, outputs these signals such that these signals reach the output side slab-waveguide $209_2$ with phase differences. Thus, a signal obtained as a result of wavelength multiplexing of the individual wavelength signal signals, is outputted from the output port 223 to be incident on and pass through the output waveguide 208 and outputted as the WDM signal 226 to the outside of the substrate $202_2$.

Meanwhile, the 1-st order diffraction beams obtained from the incident signals are focused on the first and second monitor signal ports 241 and 242. At each of these focus positions, one terminal of each of the first and second monitor signal output waveguides 231 and 232 is disposed. Thus, the wavelength multiplexed signals at these focus positions pass through the first and second monitor signal output waveguides 231 and 232 to be incident on the first and second mirrors 233 and 234. These incident signals are fully reflected to pass in the reverse direction through the first and second monitor signal output waveguides 231 and 232 and reach the first and second monitor signal ports 241 and 242. Subsequently, as described before in connection with the first embodiment, the signals pass from the input ports $221_1$ to $221_N$ through the channel waveguide array 206 and reach the input side slab-waveguide 207 shown in FIG. 3.

As shown in FIG. 3, the input waveguide 203 and the first and second monitor signal output waveguides 204 and 205 are disposed on the input side of the input side slab-waveguide 207. Thus, signals of corresponding wavelengths having passed from the first and second monitor signal output waveguides 204 and 205 in the reverse direction through the channel waveguide array 206, are outputted from the first and second monitor signal output waveguides 204 and 205. By monitoring the signals having passed through these monitor signal output waveguides 204 and 205, it is possible to check the state of the signals incident on the output side slab-waveguide $209_2$ after passing through the input waveguide 203.

Figure 5:
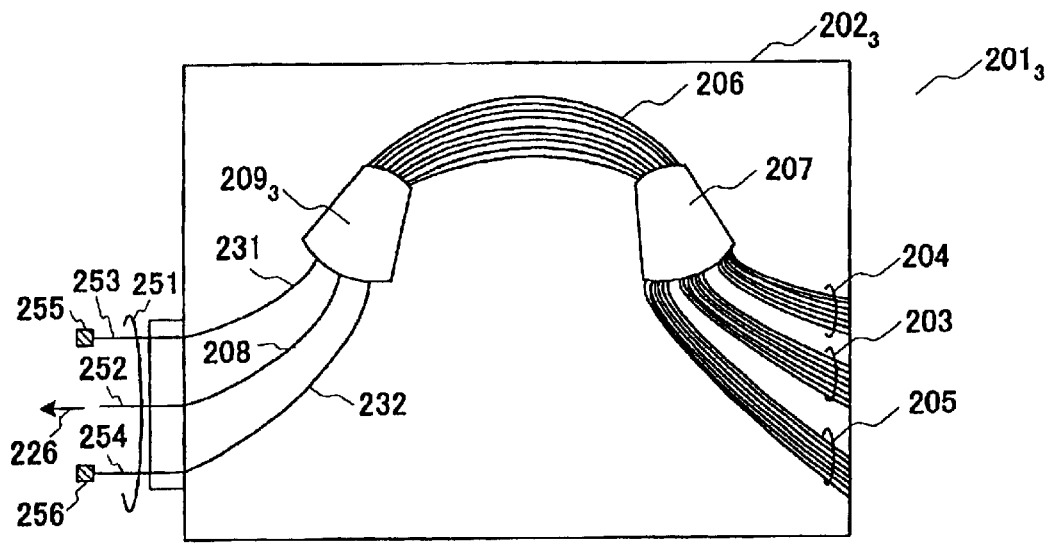
FIG. 5 shows a construction of an essential part of an optical transmission system using the arrayed waveguide grating as these third embodiment of the present invention.

FIG. 5 shows the construction of an essential part of an optical transmission system using the arrayed waveguide grating as these third embodiment of the present invention. In FIG. 5, parts like those in the first embodiment shown in FIG. 1 are designated by like reference numerals, and their description is adequately omitted. The illustrated optical transmission system as the third embodiment comprises an arrayed waveguide grating $201_3$, in which on a substrate $202_3$ are formed input waveguides 203 for inputting signals, first and second monitor signal output waveguides 204 and 205 extending adjacent to the input waveguide 203, a channel waveguide array 206 having waveguides with lengths progressively increasing by a predetermined waveguide length difference, an input side slab-waveguide 207 inter-connecting the input waveguide 203, the first and second monitor signal output waveguides 204 and 205 and the channel waveguide array 206, an output waveguide 208 for outputting a signal, a first and a second monitor signal output waveguide 231 and 232 formed on the opposite sides of the output waveguide 2023, an output side slab-waveguide $209_2$ inter-connecting the output waveguide 208, the first and second monitor signal output waveguides 231 and 232 and the channel waveguide array 206, and a first array 251 connected to the output waveguide 208 and the first and second monitor signal output waveguides 231 and 232 at one end of the substrate $202_3$.

Figure 6:
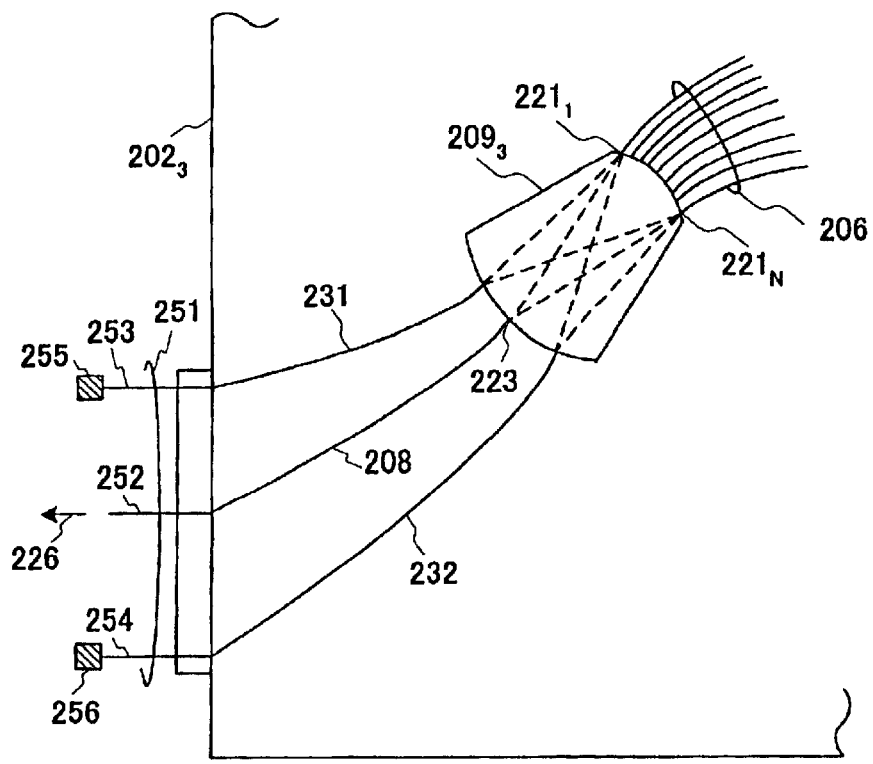
FIG. 6 shows, to an enlarged scale, an output side of the array waveguide grating and the neighborhood thereof in the optical transmission system having the foregoing construction.

FIG. 6 shows, to an enlarged scale, the output side of the array waveguide grating and the neighborhood thereof in the optical transmission system having the above construction.

The fiber array 251 includes a signal output fiber 252 optically connected to the output waveguide 208 for taking out a WDM signal 226, and monitor signal fibers 253 and 254 optically connected to the first and second monitor signal output waveguides 232 and 232. The monitor signal fiber arrays 253 and 254 have fully reflecting terminals 255 and 256 opposite the terminals on the side of the substrate 202$_3$. Such fully reflecting terminals can be realized by depositing a metal on the terminals of the monitor signal fibers 253 and 254. Alternatively, it is possible to directly use commercially available products. Of course, it is further possible to form the fully reflecting terminals 255 and 256 by disposing mirrors or like products.

Again in the arrayed waveguide grating 201$_3$ as the third embodiment, the 1-st order diffraction beams having passed through the monitor signal fibers 253 and 254 connected to the output side of the output slab-waveguide 209$_3$, are fully reflected by the fully reflecting terminals 255 and 256 to return back to the output side slab-waveguide 209$_3$. The multiplexed signals for monitoring pass in the reverse direction through the channel waveguide array 206, and are branched to be outputted as monitor signals of individual wavelengths from the first and second monitor signal output waveguides 204 and 205. By monitoring these monitor signals, it is possible to check the state of the signals incident on the output side slab-waveguide 209$_3$ after passing through the input waveguide 203.

Figure 7:
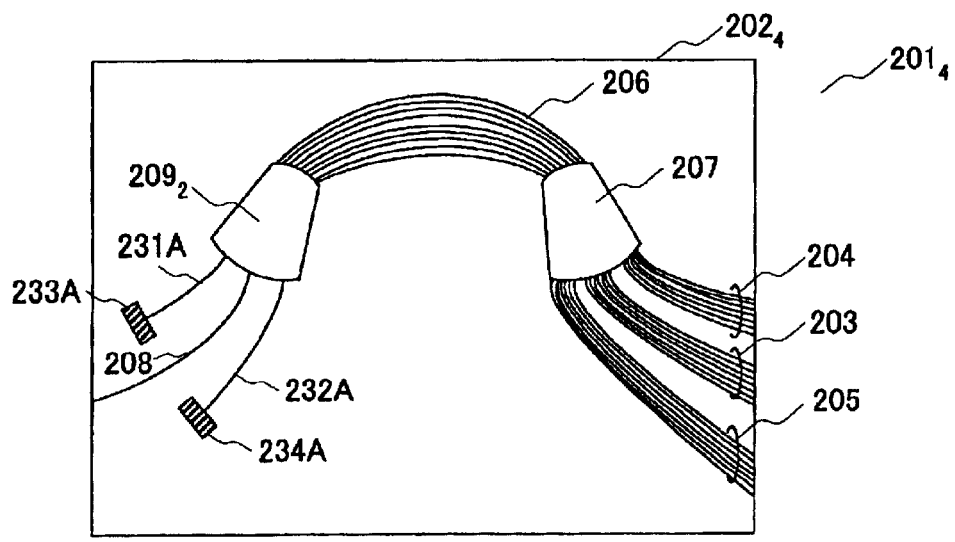
FIG. 7 shows a construction of an arrayed waveguide grating as a fourth embodiment of the present invention.

FIG. 7 shows the construction of an arrayed waveguide grating as a fourth embodiment of the present invention. In FIG. 7, parts like those in the second embodiment shown in FIG. 2 are designated by like reference numerals, and their description is adequately omitted. In the arrayed waveguide grating 201$_4$ in the optical communication system as the fourth embodiment, on a substrate 202$_4$ are formed an input waveguide 203 for inputting signals, a first and a second monitor signal output waveguide 204 and 205, a channel waveguide array 206 having waveguides with lengths progressively increasing by a predetermined waveguide length difference, an input side slab-waveguide 207 inter-connecting the input waveguide 203, the first and second monitor signal output waveguides 204 and 205 and the channel waveguide array 206, an output waveguide 205 for outputting a signal, a first and a second monitor signal waveguide 231A and 232A formed on the opposite sides of the output waveguide 207, an output side slab-waveguide 309 inter-connecting the output waveguide 208, the first and second monitor signal waveguides 231A and 232A and the channel waveguide array 206, and a first and a second mirror 233A and 234A connected to the first and second monitor signal waveguides 231A and 232A at the terminals thereof on the side opposite the output side slab-waveguide 209$_2$.

Figure 8:
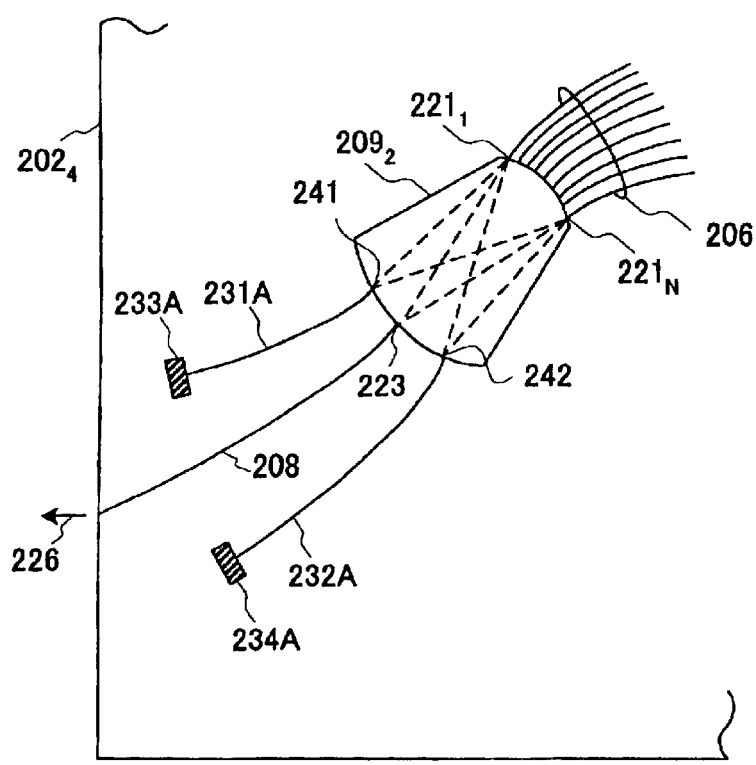
FIG. 8 shows, to an enlarged scale, an output side slab-waveguide and the neighborhood thereof in the arrayed waveguide grating having the foregoing construction.

FIG. 8 shows, to an enlarged scale, the output side slab-waveguide and the neighborhood thereof in the arrayed waveguide grating having the above construction. As shown, the output side slab-waveguide 209$_2$ of the arrayed waveguide grating has a plurality of input ports 221$_1$ to 221$_N$, to which corresponding ports of the channel waveguide array 206 are connected. signals having passed through the input side slab-waveguide and the channel waveguide array are outputted from the input ports 221$_1$ to 221$_N$. The outputted signals are wavelength multiplexed in the output side slab-waveguide 209$_1$ on the output side end face thereof. The output side slab-wavelength 209$_1$ has an output port 223 disposed on the focus position of the 0-th order diffraction beams to be obtained from the signals. At the output port 223, one terminal of the output wavelength 208 is disposed. At focus positions 224$_1$ and 224$_2$ of the 1-st order diffraction beams of the signals of the individual wavelengths inputted from the input ports 221$_1$ to 221$_N$, a first and a second monitor signal port 241 and 242 are disposed.

A first monitor signal waveguide 231A is connected at one terminal to the first monitor signal port 241, and has the other terminal facing the reflecting surface of a first mirror 233A, which is formed by deposition or like means at a predetermined position on the inner side of end face of the substrate 202$_4$. A second monitor signal waveguide 232A is connected at one terminal to the first monitor signal port 241, and has the other terminal facing the reflecting surface of a second mirror 234A, which is formed by deposition or like means at a predetermined position on the inner side of the end face of the substrate 202$_2$. The first and second mirrors 233A and 234A may also be formed by depositing metal or the like on or bonding material having a individual refractive index to the other terminal of the first and second monitor signal waveguides 231A and 232A.

In the arrayed waveguide grating 201$_4$ as the fourth embodiment having the above construction, when signals of individual wavelengths are inputted from the input waveguide 203, the channel waveguide array 206 with wavelengths thereof progressively increasing by a predetermined waveguide length difference, outputs these signals such that these signals reach the output side slab-waveguide 209$_2$ with phase differences. Thus, a signal obtained as a result of wavelength multiplexing of the individual wavelength signals, is outputted from the output part 223 to be incident on and pass through the output waveguide 208 and outputted as the WDM signal 226 to the outside of the substrate 202$_2$.

Meanwhile, the 1-st order diffraction beams obtained from the incident signals are focused on the first and second monitor signal ports 241 and 242. At each of these focus positions, one terminal of each of the first and second monitor signal waveguides 231A and 232A is disposed. Thus, the wavelength multiplexed signals at these focus positions pass through the first and second monitor signal waveguides 231A and 232A incident on the first and second mirrors 233A and 234A. These incident signals are fully reflected and pass in the reverse direction through the first and second monitor signal output waveguides 231A and 232A to the first and second signal ports 241 and 242. Subsequently, as described before in connection with the first embodiment, the signals pass from the input ports 221$_1$ to 221$_N$ through the channel waveguide array 206 to the input side slab-waveguide 207 shown in FIG. 7.

As shown in FIG. 7, the input waveguide 203 and the first and second monitor signal output waveguides 204 and 205 are disposed on the input side of the input side slab-waveguide 207. Thus, signals of corresponding wavelengths having passed from the first and second monitor signal output waveguides 204 and 205 in the reverse direction through the channel waveguide array 206, are outputted from the first and second monitor signal output waveguides 204 and 205. By monitoring at least one of the signal signals having passed through these monitor signal output waveguides 204 and 205, it is possible to check the state of the signals incident on the output side slab-waveguide 209$_2$ after passing through the input waveguide 203.

Figure 9:
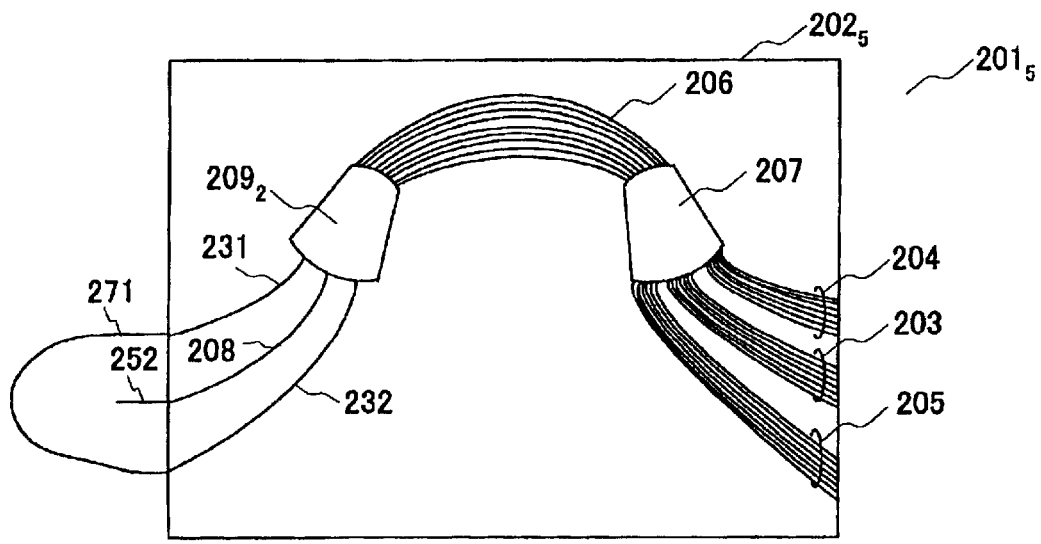
FIG. 9 shows a construction of an essential part of the optical communication system using an arrayed waveguide grating in a fifth embodiment of the present invention.

FIG. 9 shows the construction of an essential part of the optical communication system using an arrayed waveguide grating in a fifth embodiment of the present invention. In FIG. 9, parts like those in the second embodiment shown in FIG. 3 are designated by like reference numerals, and their description is adequately omitted. In the arrayed waveguide grating $201_5$ of the optical communication device shown in FIG. 5, on a substrate $202_5$ are formed an input waveguide 203 for inputting signals, a first and a second monitor signal output waveguide 204 and 205 formed on the opposite sides of the input waveguide 203, a channel waveguide array 206 having waveguides with lengths progressively increasing by a predetermined waveguide length difference, an input side slab-waveguide 207 inter-connecting the input waveguide 203, the first and second monitor signal waveguides 204 and 205 and the channel waveguide array 206, an output waveguide 208 for outputting signals, a first and a second monitor signal waveguide 231 and 232 formed on the opposite sides of the output waveguide 208, an output side slab-waveguide $209_2$ inter-connecting the output waveguide 208, the first and second monitor signal waveguides 231 and 232 and the channel waveguide array 206, and an optical fiber 272 inter-connecting the first and second monitor signal waveguides 231 and 232 at one end of the substrate $202_5$.

Figure 10:
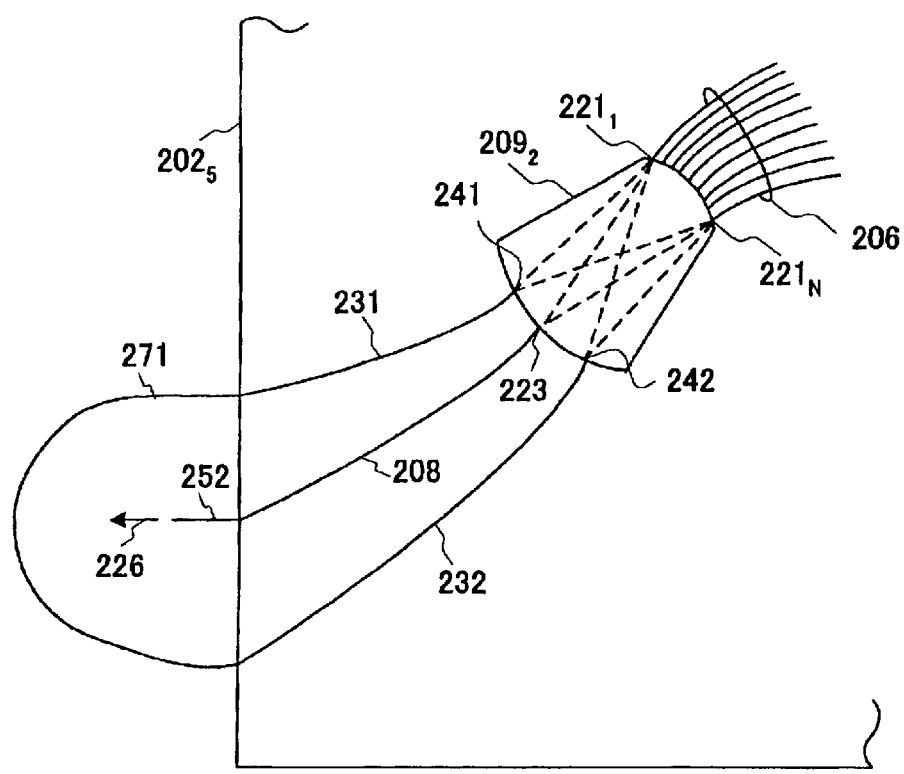
FIG. 10 shows, to an enlarged scale, an output side of the array waveguide grating and the neighborhood thereof in the optical communication system having the foregoing construction.

FIG. 10 shows, to an enlarged scale, the output side of the array waveguide grating and the neighborhood thereof in the optical communication system having the above construction. At the end of the substrate $202_5$, a signal output fiber 252 is connected to the output waveguide 208, while like terminals of the first and second monitor signal waveguides 231 and 232 are inter-connected by the optical fiber 201. Thus, the multiplexed monitor signal inputted to the first monitor signal waveguide 231 returns through the optical fiber 271 to the second monitor signal waveguide 232, and the multiplexed monitor signal inputted to the second monitor signal waveguide 232 returns through the optical fiber 271 to the first monitor signal waveguide 231. The multiplexed monitor signals thus returned to the output side slab-waveguide $209_3$ pass in the reverse direction through the channel waveguide grating 206 and branched to be outputted as monitor signals of individual wavelengths from the first and second monitor signal output waveguides 204 and 205 shown in FIG. 9. By monitoring these signals, it is possible to check the state of the signals incident on the output side slab-waveguide $209_3$ after passing through the input waveguide 203.

Figure 11:
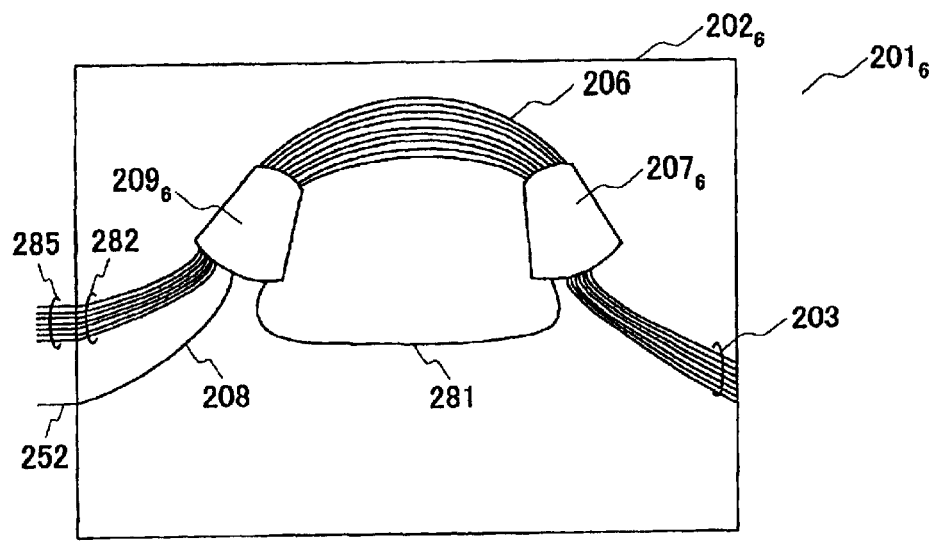
FIG. 11 shows an construction of an arrayed waveguide grating as a sixth embodiment of the present invention.

FIG. 11 shows the construction of an arrayed waveguide grating as a sixth embodiment of the present invention. In FIG. 11, parts like those in the second embodiment shown in FIG. 3 are designated by like reference numerals, and their description is adequately omitted.

In the arrayed waveguide grating $201_6$ as the sixth embodiment, on a substrate $202_6$ are formed an input waveguide 203 for inputting signals, a channel waveguide grating 206 having waveguides with lengths progressively increasing by a predetermined waveguide length difference, an input side slab-wavelength inter-connecting the input wavelength 203, a feedback waveguide 281 and a channel waveguide array $207_6$, an output waveguide 208 for outputting a signal, a monitor signal output waveguide 282 having one end connected to one end of the substrate $202_6$, and an output side slab-waveguide. $209_6$ inter-connecting the output waveguide 208, the other terminals of the monitor signal output waveguide 202 and the feedback waveguide 201 and the channel waveguide array 206.

Figure 12:
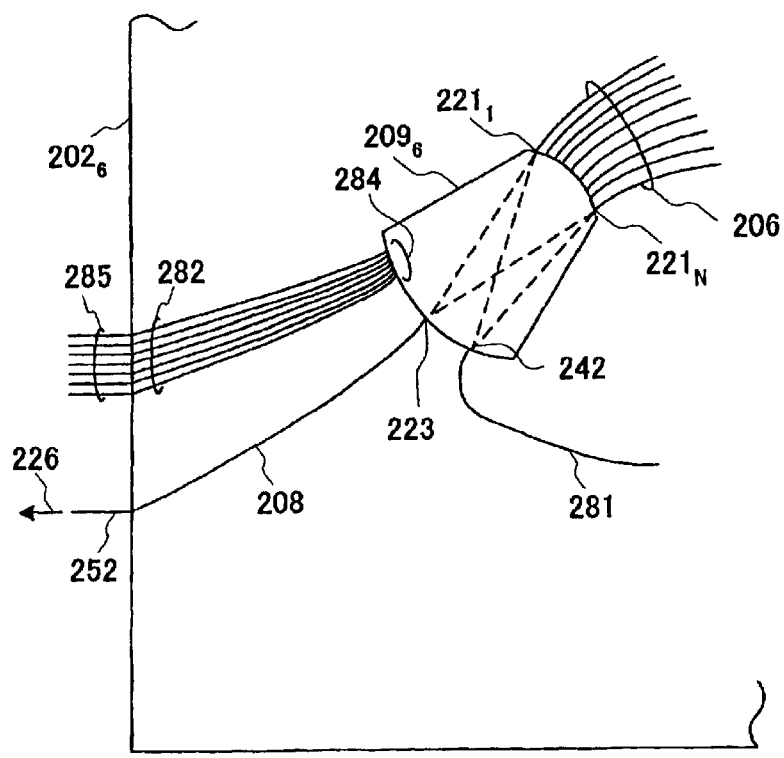
FIG. 12 shows, to an enlarged scale, an output side slab-waveguide, the neighborhood thereof an the arrayed waveguide grating having the foregoing construction.

FIG. 12 shows, to an enlarged scale, the output side slab-waveguide, the neighborhood thereof an the arrayed waveguide grating having the above construction. As shown, the output side slab-waveguide $209_6$ has a plurality of input ports $221_1$ to $221_N$, to which corresponding ports of the channel waveguide array are connected. signals having passed through the input side slab-waveguide and the channel waveguide array are outputted from the input ports $221_1$ to $221_N$. The outputted signals are multiplexed in the output side slab-waveguide $209_1$ to be focused on the output side end face thereof. At the focus position of the 0-th order diffraction beams of signals, an output port 223 is disposed. At the output port 223, one terminal of the output waveguide is disposed. At the focus position of the 1-st diffraction beams of the signals led out from the input ports $221_1$ to $221_N$, the afore-mentioned other terminal of the feedback waveguide 281 is disposed.

The monitor signal output waveguide 282 has one terminal connected to a feedback signal focus position 284 individual from the focus position of the signals outputted from the input waveguide 203, and its other terminal ports extend up to the end face of the substrate $202_2$ and connected to terminals of optical fibers constituting the monitor signal fiber array 285. To the output waveguide 208 is connected a WDM signal output fiber 252 for taking out a WDM signal 226 optically coupled thereto.

In the arrayed waveguide grating $201_6$ as the sixth embodiment having the above construction, when signals of individual wavelengths are inputted from the input waveguide 208, the channel waveguide array 206 having waveguides with wavelengths thereof progressively increasing by a predetermined waveguide length difference, outputs these signals such that these signals are inputted to the output side slab-waveguide $209_6$ with phase differences. Thus, a signal obtained as a result of wavelength multiplexing of the individual wavelength signals is outputted from the output port 223 to be incident on and passed through the output waveguide 208 and outputted as the WDM signal 226 to the outside of the substrate $202_2$.

Meanwhile, the 1-st order diffraction beams obtained from the incident signals inputted from the input waveguide are focused on the 1-st order diffraction beam focus position $224_2$. The feedback waveguide 281 has one terminal of the feedback waveguide 281 disposed at this focus position. Thus, the wavelength multiplexed signal at this focus position pass through the feedback waveguide 281 to be inputted to the input side slab-waveguide $207_6$ from the input port thereof. This multiplexed monitor signal is inputted to the channel waveguide array 206 together with the intrinsic signals from the input waveguide 203. The incident signals pass through the channel waveguide array 206, and are branched in the output side slab-waveguide $209_6$ to the initial wavelengths for being outputted. Thus, monitor signals branched to the individual wavelengths are obtained at the feedback signal focus position 204. By monitoring signals having passed through the monitor signal fiber array 285, it is possible to check the state of the signals incident on the output side slab-waveguide $209_6$ after passing through the input waveguide 203.

Figure 13:
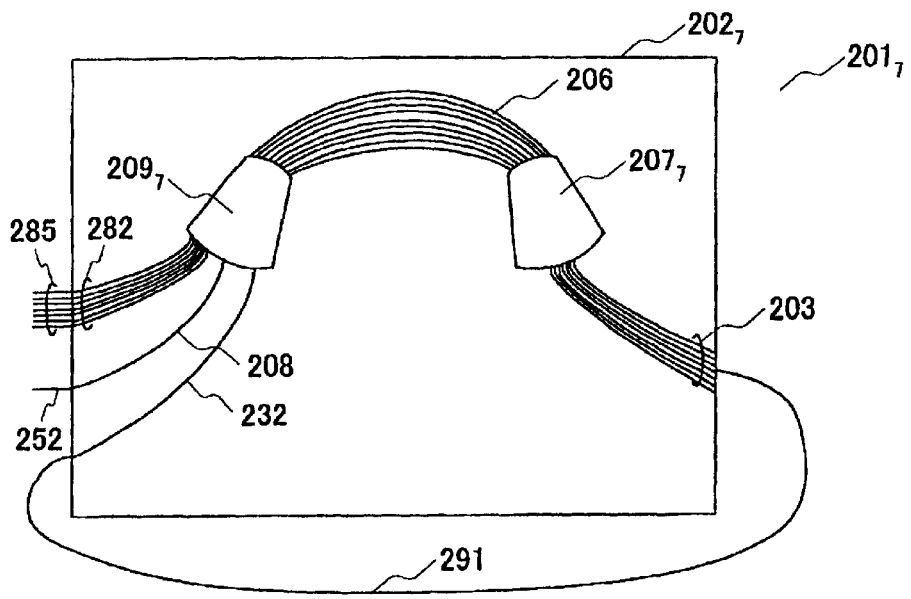
FIG. 13 shows a construction of an essential part of an optical communication system using an arrayed waveguide grating in a seventh embodiment of the present invention.

FIG. 13 shows the construction of an essential part of an optical communication system using an arrayed waveguide grating in a seventh embodiment of the present invention. In FIG. 13, parts like those in the second embodiment shown in FIG. 2 are designated by like reference numerals, and their description is adequately omitted.

In the arrayed waveguide grating $201_7$ as the seventh embodiment, on a substrate $202_7$ are formed an input waveguides 203 for inputting signals, a channel waveguide grating 206 having waveguides with lengths progressively increasing by a predetermined waveguide length difference, an input side slab-waveguide $207_7$ inter-connecting the input waveguide 203 and the channel waveguide array 206, output waveguides 208 for outputting signals, a monitor signal output waveguide 282 having one terminal disposed on one end of the substrate $202_2$, a second monitor signal waveguide, and an output side slab-waveguide $209_6$ interconnecting the output waveguides 208 and one terminals of the monitor signal 282 and the second monitor signal waveguide 232. The other terminal of the second monitor signal waveguide 232 extends up to the end face of the substrate $202_7$, the end face being connected to the input side slab-waveguide $207_7$ by a feedback signal fiber 291.

Figure 14:
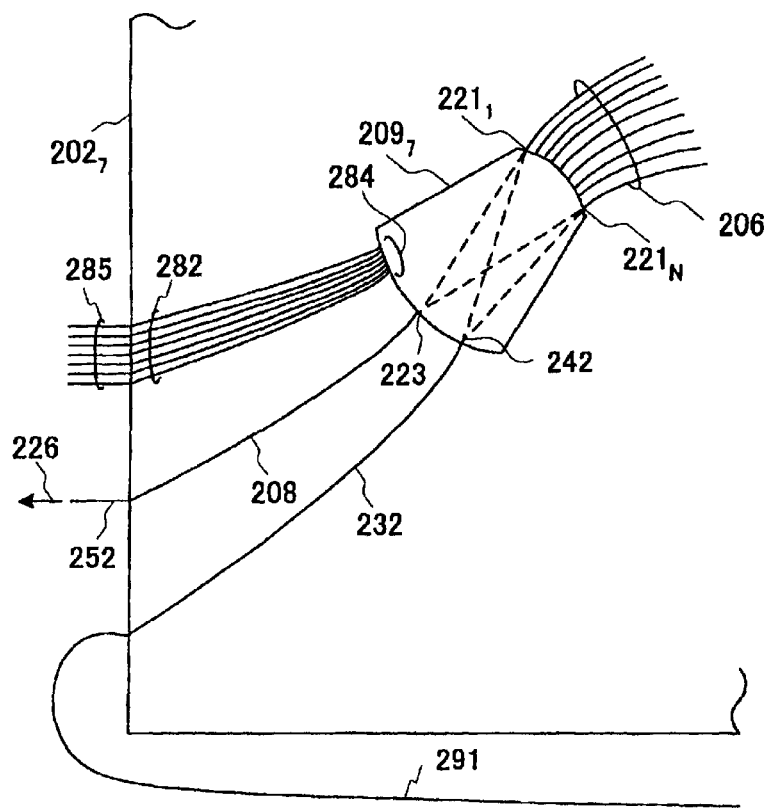
FIG. 14 shows, to an enlarged scale, an output side slab-waveguide and the neighborhood thereof in the optical communication system having the foregoing construction.

FIG. 14 shows, to an enlarged scale, the output side slab-waveguide and the neighborhood thereof in the optical communication system having the above construction. As shown, the output side slab-waveguide $209_1$ has a plurality of input terminals $221_1$–$221_N$, to which corresponding wavelength ports of the channel waveguide array 206 are connected. Signals having passed through the input side slab-waveguide and the channel waveguide array are outputted from the input ports $221_1$ to $221_N$. The outputted signals are multiplied in the output side slab-waveguide $209_1$ to be focused on the output side end face thereof. The output side slab-waveguide has an output port 223 disposed on the focus position of the 0-th order diffraction beams obtained from the signals. At the output port 223, one terminal of the output waveguide 208 is disposed. At the focus position $224_2$ of the 1-st diffraction beams obtained from the signals incident on the input ports $221_1$ to $221_N$, the aforementioned other terminal 242 of the feedback signal waveguide 281 is disposed.

At the branched fed-back monitor signal focus position 284, one terminal of the monitor signal output waveguide 282 is connected. The other terminal of the monitor signal output waveguide 282 extends up to the end face $202_2$ and is connected to terminals of optical fibers constituting a monitor signal fiber array 285. To the output waveguide 203 is connected a WDM signal output fiber 252 optically coupled thereto for taking out a WDM signal 226. The other end of the second monitor signal waveguide 232 is connected to one terminal of the feedback signal fiber 291.

In the arrayed waveguide grating $201_7$ as the seventh embodiment, when a plurality of signals of individual wavelengths are inputted from the input waveguide 203, the channel waveguide array 206 having waveguides with wavelength thereof increasing progressively by a predetermined length difference, outputs these signals such that these signals are inputted to the output side slab-waveguide $209_6$ with phase differences. Thus, a signal obtained as a result of wavelength multiplexing of the individual wavelength signals, passes from the output port 223 to be incident on and pass through the output waveguide 208 and outputted as the WDM signal 226 to the outside of the substrate $202_2$.

Meanwhile, the 1-st order diffraction beams obtained from the incident signal are focused on the focus position $224_2$ of the 1-st diffraction beams of the signals inputted from the input waveguide. At this focus position, one terminal of the second monitor signal waveguide 232 is disposed. Thus, the wavelength multiplexed signal at the focus position noted above pass through the second monitor signal waveguide 232 and thence through the feedback signal optical fiber 291 and are inputted to the input side slab-waveguide $207_7$ from the input port thereof. This multiplexed monitor signal is inputted to the channel waveguide array 208 together with the intrinsic signals from the input waveguide 203. These inputted signals pass through the channel waveguide array 206 and branched in the output side slab-waveguide $209_4$ to the initial wavelengths and outputted. The monitor signals obtained as a result of the branching to the individual wavelengths are obtained at the feedback signal focus position 284. Thus, by monitoring the monitor signals having passed through the monitor signal fiber array, it is possible to check the state of the signals inputted to the output side slab-waveguide $209_6$ after passing through the input waveguide 203.

In the first to fifth embodiments described above, the monitor signal returned to the input side slab-waveguide 207 is taken out by using the first or second monitor signal output waveguide 204 or 205. This means that if no measure is provided, the monitor signal inputted in the reverse direction to the input side slab-waveguide 207 is also led to the input waveguide 203 to be transmitted to the signal transmitting side or the signal source side. The same problem takes place in the output side slab-waveguides $209_6$ and $209_7$ as the sixth and seventh embodiments. The problem can be solved by various measures. However, instead of adopting such measures, it is effective to reduce the level of the monitor signal inputted to the input waveguide 203 down to such a level as not to present any practical problem.

Figure 15:
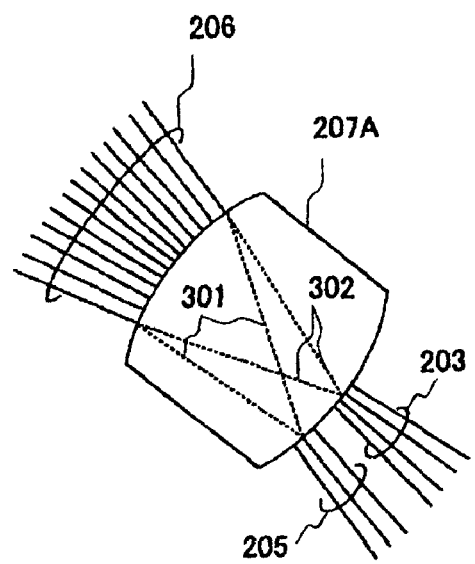
FIG. 15 shows an input side slab-waveguide and the input/output terminal neighborhood thereof of an arrayed waveguide grating in an eighth embodiment of the present invention.

FIG. 15 shows an input side slab-waveguide and the input/output terminal neighborhood thereof of an arrayed waveguide grating in an eighth embodiment of the present invention. In FIG. 15, parts like those in FIG. 1 are designated by like reference numerals, and their description is adequately omitted. In the input side slab-waveguide 207A in this embodiment, the 0-th order diffraction beams 301 inputted from a channel waveguide array 206 to an input side slab-waveguide 207A is focused on a second monitor signal output waveguide 205 at each monitor signal port thereof. The input waveguide 203 is disposed such that the 1-st order diffraction beams of the monitor signals are focused at positions shifted by one-half channel, i.e, at positions mid way between adjacent its main signal input ports.

Since the input waveguide 203 is disposed such that the 0-th order diffraction beams are focused on the positions mid way between the input ports, it is possible to reduce the level of the monitor signals returning through the input waveguide 203 to the signal source side down to such an extent that practically no problem arises.

Figure 16:
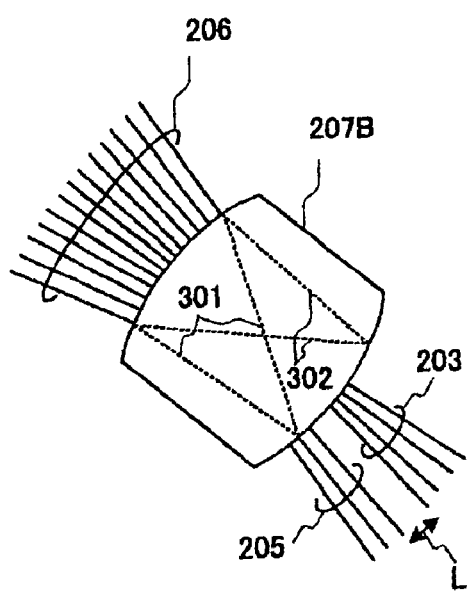
FIG. 16 shows an input side slab-waveguide and the input/output terminal neighborhood of an arrayed waveguide grating as a ninth embodiment of the present invention.

FIG. 16 shows an input side slab-waveguide and the input/output terminal neighborhood of an arrayed waveguide grating as a ninth embodiment of the present invention. In FIG. 16, parts like these in FIG. 1 are designated by like reference numerals, and their description is adequately omitted. In the input side slab-waveguide 207B in this embodiment, the 0-th order diffraction beams 301 inputted from the channel waveguide array 206 to the input side slab-waveguide 207A is focused on the second monitor signal output waveguide 205 at each monitor signal port position. This is the same as in the case of the eighth embodiment. In this embodiment, the focus positions of the 0-th and 1-ast order diffraction beams are spaced apart by a distance L greater than that in the case of the eighth embodiment. That is, the 1-st diffraction beams 302 of the monitor signals are focused at a position spaced apart to the side of the port disposition position of the input waveguide 203 opposite the port disposition position of the second monitor signal output waveguide 205.

At each main signal port, the 2-nd and higher order monitor signals (not shown) are focused at positions spaced apart from the port disposition position of the input waveguide 203, and thus no problem arises concerning the monitor signals returning to the signal source side by passing through the input waveguide 203.

Figure 17:
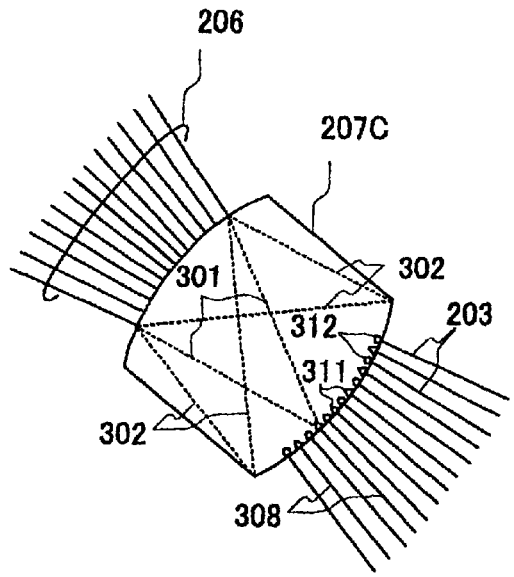
FIG. 17 shows an input side slab-waveguide and the input/output port neighborhood of an arrayed waveguide grating in a tenth embodiment of the present invention.

FIG. 17 shows an input side slab-waveguide and the input/output port neighborhood of an arrayed waveguide grating in a tenth embodiment of the present invention. In FIG. 17, parts like those shown in FIG. 12 are designated by like reference numerals. In the input side slab-waveguide 207C in this embodiment, the 0-th order diffraction beams 301 inputted from the output side of the channel waveguide array 206 are focused on each monitor signal port position of the monitor signal output waveguide 308.

In this embodiment, the monitor signal output waveguide 308 has monitor signal input ports (shown by triangle mark) disposed mid way between adjacent ones of the input ports 312 (shown by circle mark) of the input waveguide 203. The 1-st and higher order diffraction beams of the monitor signals are focused on the output side of these focus positions. Thus, again in this embodiment, it is possible to greatly reduce the monitor signals passing from the input ports 312 to the input waveguide 203. Besides, since the input waveguide 203 and the monitor signal output waveguide 308 are both disposed on the central part of the input side slab-waveguide 207C, it is possible to reduce loss in the monitor signal output waveguide 308.

In the above eighth to tenth embodiments, it has been shown that it is possible to reduce attenuation by reflection to the side of the main ports. Specific arrangements for practicing this will now be described.

Figure 18:
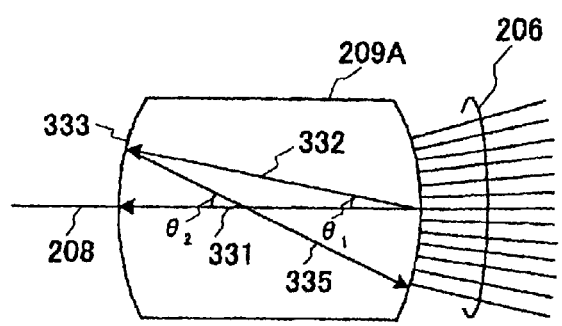
FIG. 18 shows an output side slab-waveguide and the neighborhood thereof in an arrayed waveguide grating in an eleventh embodiment of the present invention.

FIG. 18 shows an output side slab-waveguide and the neighborhood thereof in an arrayed waveguide grating in an eleventh embodiment of the present invention. The 0-th order diffraction beams 331 inputted from a channel waveguide array 206 to an output side slab-waveguide 209A pass from the output port to an output waveguide 208. The 1-st order diffraction beams 332 are incident in a mirror 333 on a direction signally inclined from perpendicular direction to the 1-st order diffraction beams 332 and are returned as reflected signals 335 to the output side of the channel waveguide array 206.

Denoting the angle defined by the optical paths of the 0-th and 1-st diffraction beams in the Figure by $\theta_1$ and the angle defined by the optical paths of the 0-order diffraction beams 331 and the reflected signals 335 by $\theta_2$, by merely signally changing the angle of the monitor signals reflected from the output side slab-waveguide 209A, it is possible to reduce the quantity of monitor signals returning to the input waveguide 203 (see FIG. 1) compared to the case, in which the monitor signals return along the same path as of the inputted signals as in the first embodiment shown in FIG. 2.

The mirror 333 can be formed highly accurately by means of depositing a metal or a material individual from the neighboring material on a part corresponding to it during or after the formation of the output side slab-waveguide 209A. It is also possible to from an additional mirror on the 1-st diffraction beam focus position on the opposite side of the output waveguide 208. This also is true in a twelfth embodiment to be next described.

Figure 19:
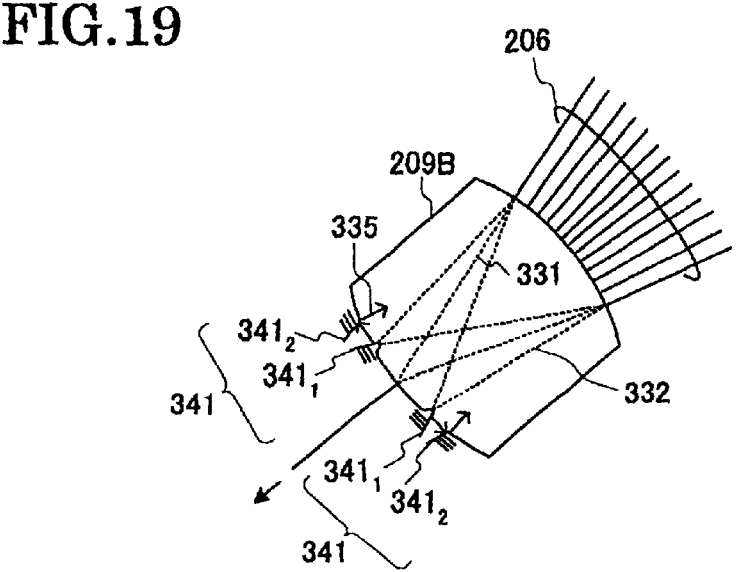
FIG. 19 shows an output side slab-waveguide and the neighborhood thereof of an arrayed waveguide grating in the twelfth embodiment of the present invention.

FIG. 19 shows an output side slab-waveguide and the neighborhood thereof of an arrayed waveguide grating in the twelfth embodiment of the present invention. In FIG. 19, parts like those in FIG. 19 are designated by like reference numerals, and their description is adequately omitted.

In the output side slab-waveguide 209B as this embodiment, unlike the preceding eleventh embodiment, two mirrors 341 are disposed at the 1-st order diffraction beam signal focus position. The two mirrors 341 each have two faces $341_1$ and $341_2$ spaced apart from and facing each other. The spacing and angle between the two faces $341_1$ and $341_2$ of each of the two mirrors 341 can be controlled independently of the other. Thus, it is possible to increase the reflection angle control range compared to the eleventh embodiment. Of course, it is possible to use three or more reflecting mirrors, and the reflecting mirror or mirrors may be disposed at any position or positions in the output side slab-waveguide 209B.

Figure 20:
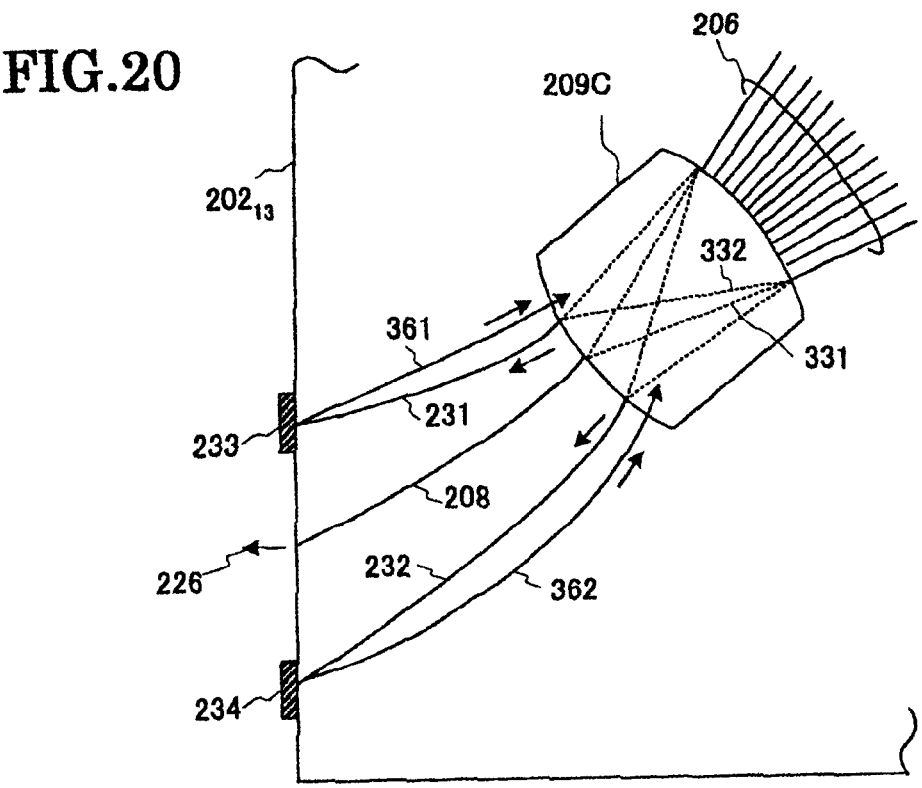
FIG. 20 shows an output side slab-waveguide and the neighborhood thereof in an arrayed waveguide grating as a thirteenth embodiment of the present invention.

FIG. 20 shows an output side slab-waveguide and the neighborhood thereof in an arrayed waveguide grating as a thirteenth embodiment of the present invention. In FIG. 20, parts like those in FIGS. 4 and 18 are designated by like reference numerals, and their description is adequately omitted.

In the output side slab-waveguide 209C as this embodiment, like the substrate $202_2$ in the second embodiment shown in FIGS. 3 and 4, has a first and a second mirror 233 and 234 formed at one end. A first monitor signal waveguide 231 has one terminal connected to a first monitor signal port 241, on which the 1-st diffraction beams are focused, and its other terminal faces the reflecting surface of the first monitor 233 formed on the end face of the substrate $202_2$. The second monitor signal waveguide 232 has one terminal connected to the second monitor signal port 242, on which the 1-st order diffraction beams are focused, and its other terminal faces the reflecting face of the second mirror 234 formed on the end face of the substrate $202_2$.

In this embodiment, unlike the substrate $202_2$ in the second embodiment, the reflected signals of the monitor signals from the first mirror 233 are returned through a first reflected signal waveguide 361 to an output side slab-waveguide 209C from a position thereof, which neither the 0-th or the 1-st order diffraction beam focus position. This also applies to the second mirror 234, that is, the reflected signals of the monitor signals from the mirror are returned through a second reflected signal waveguide 209C from a position thereof, which is neither the 0-th nor the 1-st order diffraction beam focus position. It is thus possible to reduce the quantity of signals returned to the input waveguide 203 (see FIG. 1). It is not necessary to use the two, i.e., the first and second, mirrors as in this example, and either one mirror may suffice. This also applies to a fourteenth and a fifteenth embodiment described hereinunder.

Figure 21:
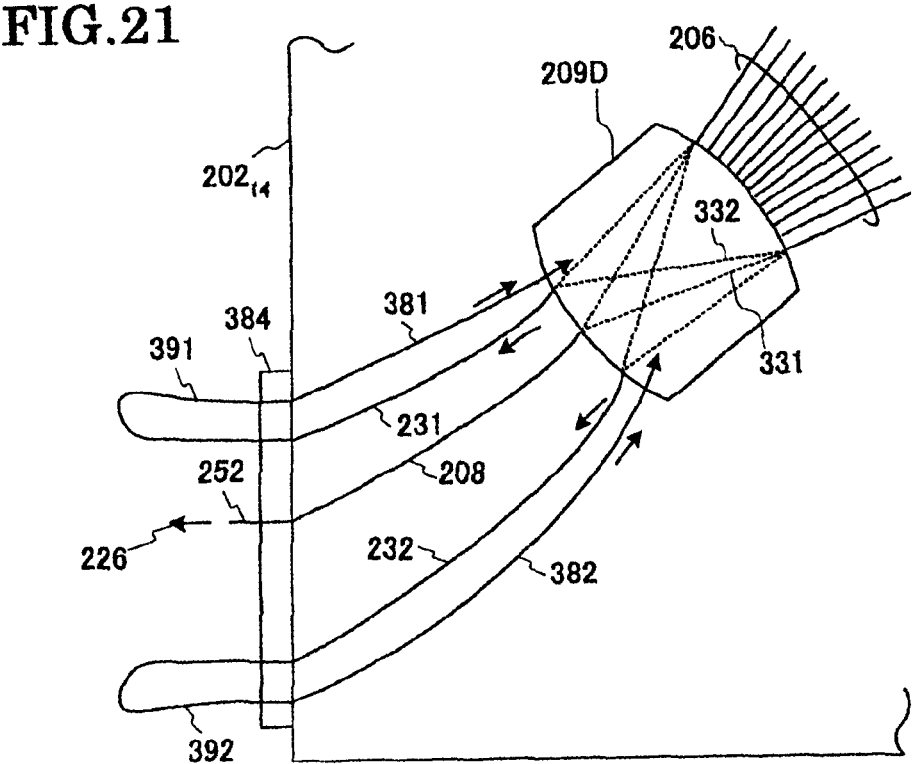
FIG. 21 shows an output side slab-waveguide and the neighborhood thereof of an arrayed waveguide grating in the fourteenth embodiment of the present invention.

FIG. 21 shows an output side slab-waveguide and the neighborhood thereof of an arrayed waveguide grating in the fourteenth embodiment of the present invention. In FIG. 21, parts like those in FIGS. 10 and 20 are designated by like reference numerals, and their description is adequately omitted.

In the output side slab-waveguide 209D as this embodiment, a first and a second monitor signal waveguide 231 and 232 extend up to the end face of the substrate $202_{14}$. Also, a first and a second reflected signal waveguide 381 and 382 are provided such that they extend substantially parallel to the monitor signal waveguides 231 and 232. The first reflected signal waveguide 381 is connected to the output side slab-waveguide 209D at the same position thereof as of the first reflected signal waveguide 361 shown in FIG. 20. Likewise, the second reflected signal waveguide 209D is connected to the output side slab-waveguide 209D at the same position as of the second reflected signal waveguide 362 shown in FIG. 20. A fiber array 384 is connected to the end face of the substrate $202_{14}$.

In the fiber array 384, a signal output fiber 252 is optically coupled to the output waveguide 208 for taking out the WDM signal 226. A first connecting optical fiber 391 inter-connects the first monitor signal waveguide 231 and the first reflected signal waveguide 381. Likewise, a second connecting optical fiber 392 inter-connects the second monitor signal waveguide 232 and the second reflected signal waveguide 382. Thus, one monitor signal is returned through the first reflected signal waveguide 381 is returned to the output side slab-waveguide 209D from a position thereof, which is neither the 0-th or the 1-st diffraction beam focus position. It is thus possible to reduce the quantity of signals returned to the input waveguide (see FIG. 1).

Figure 22:
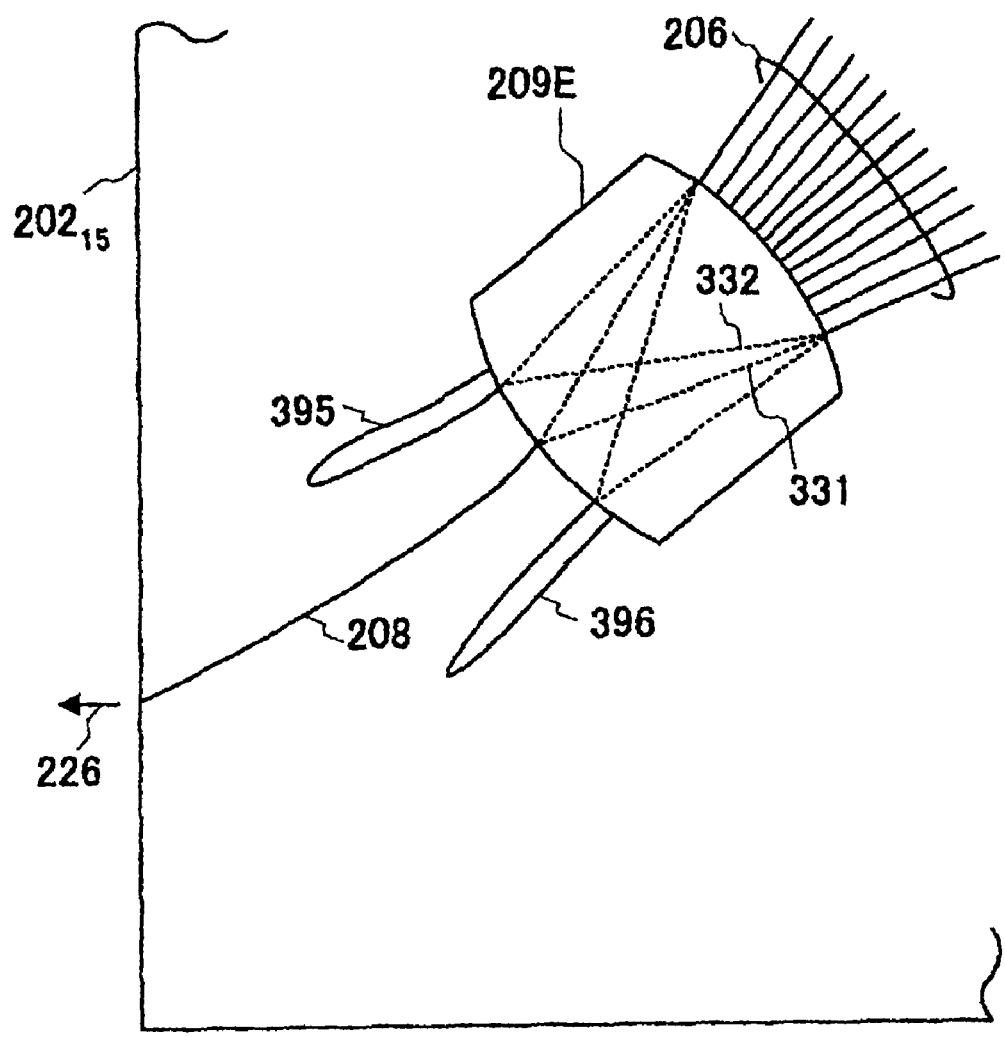
FIG. 22 shows an output side slab-waveguide and the neighborhood thereof in an arrayed waveguide grating as the fifteenth embodiment of the present invention.

FIG. 22 shows an output side slab-waveguide and the neighborhood thereof in an arrayed waveguide grating as the fifteenth embodiment of the present invention. In FIG. 22, parts like those in FIG. 21 are designated by like reference numerals, and their description is adequately omitted.

In this embodiment, the output side slab-waveguide 209E has a first connecting waveguide 395 extending along such a path as to optically inter-connect the first monitor signal waveguide 31 and the first reflected signal waveguide 381 in the previous embodiment 5 on the inner side of the substrate $202_{15}$. The output side slab-waveguide 209E also has a second connecting waveguide 396 formed along such a path as to optically inter-connect the second monitor signal waveguide 232 and the second reflected signal waveguide 382 on the inner side of the substrate $202_{15}$. Thus, monitor signal is returned through the first connecting waveguide 395 to the output side slab-waveguide 209B at a position thereof, which is neither the 0-th nor the 1-st diffraction beam focus position. The other monitor signal is returned through the second connecting waveguide 396 of the output side slab-waveguide 209B at a position thereof, which is neither the 0-th nor the 1-st diffraction beam focus position. Thus, it is possible to reduce the quantity of signals returning to the input waveguide (see FIG. 1).

Figure 23:
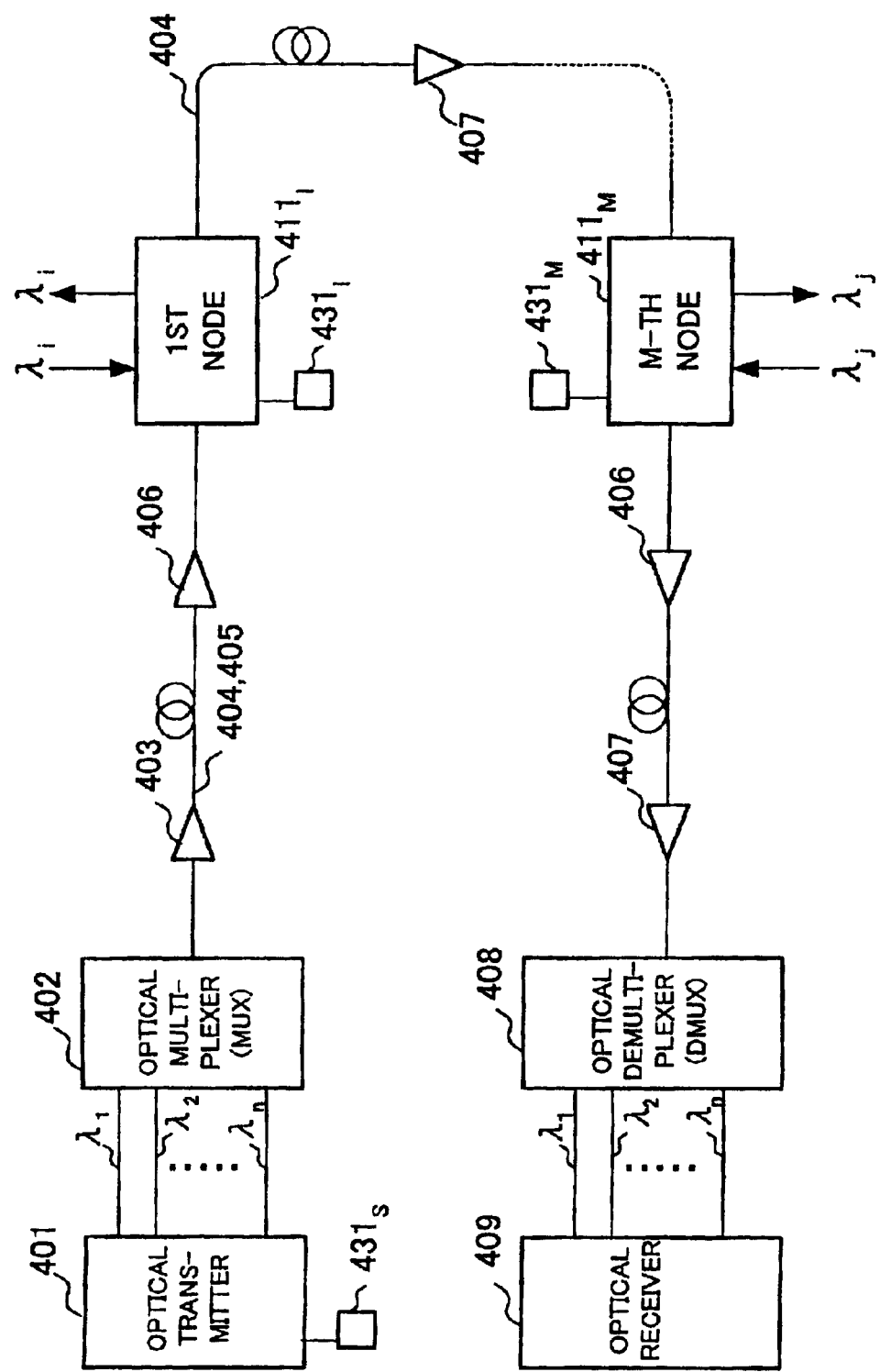
FIG. 23 shows a summary of the construction of an optical communication system as a third embodiment of the present invention.

FIG. 23 shows a summary of the construction of an optical communication system as a third embodiment of the present invention. In this optical communication system, signals of N channels of waveguides 1 to N outputted to an optical transmitter connected to an SONET (Synchronous Optical Network) system (not shown) provided on the transmission side, are multiplexed in an optical multiplexer (MUX) 402, then amplified in a booster amplifier 403 and then outputted to an optical transmission line 404. The optical multiplexer 402 is constituted by, for instance, an arrayed waveguide grating such as described before in connection with the first embodiment. The wavelength multiplexed signal 405 is adequately amplified in an in-line amplifier 406, and then led through a pre-amplifier 407 to an optical demultiplexer (DMUX) 408 for demultiplexing to separate the initial wavelengths $\lambda_1$ to $\lambda_N$, which are received in an optical receiver 409. On the optical transmission line 404, a suitable number of nodes (OADM) $411_1$ to $411_N$ are disposed. Signals of desired wavelengths are inputted to and outputted from the nodes $411_1$ to $411_N$.

Figure 24:
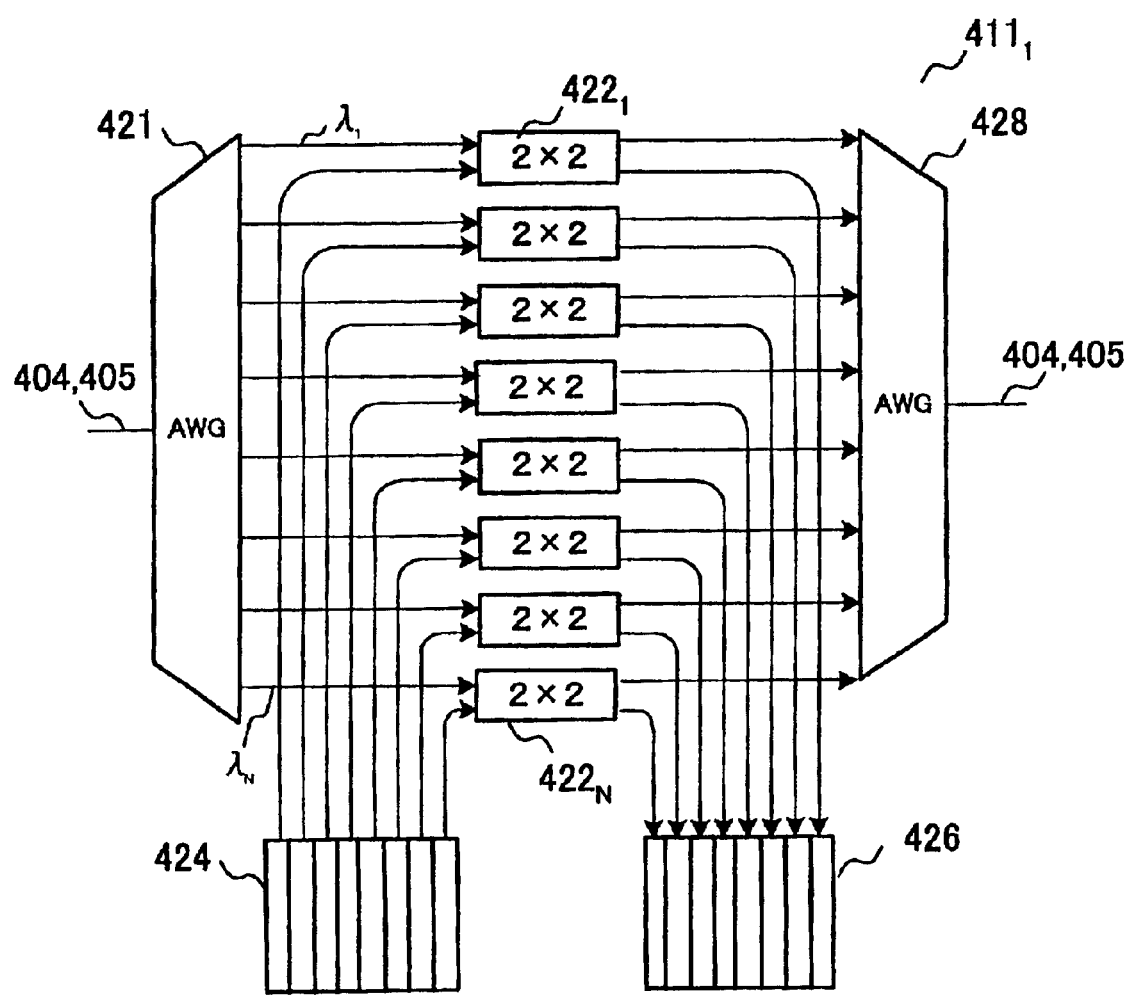
FIG. 24 shows a summary of the construction of the nodes.

FIG. 24 shows a summary of the construction of the nodes. Here, the first node 411 is shown, but the second to M-th nodes $411_2$ to $411_M$ also have the same construction. The signal from the optical transmission line 404 shown in FIG. 23 is inputted to an input side arrayed waveguide grating 421 in the first node 4111 for demultiplexing to separate signal signals in N channels of wavelengths $\lambda_1$ to $\lambda_N$. The separated signals of the wavelengths $\lambda_1$ to $\lambda_N$ are dropped by two-input two-output optical switches $422_1$ to $422_N$, which are each provided for each of the wavelengths $\lambda_1$ to $\lambda_N$, to a node side receiver 426. Also, signals transmitted from the wavelengths $\lambda_1$ and $\lambda_N$ are added from a node side transmitter 424. An output side arrayed waveguide grating 428 is an element having a construction inverse to the input side arrayed waveguide grating 421, and it multiplexes the signals in the N channels of the wavelengths $\lambda_1$ to $\lambda_N$ to output the signal 405 obtained by the wavelength multiplexing to the optical transmission line 404.

As shown above, the first node $411_1$ shown in FIG. 24, the second to M-th nodes $411_2$ to $411_N$ (not shown) and the optical multiplexer 408 all use an arrayed waveguide grating. Thus, to meet a demand for increasing the channel number N of the signal 405, the wavelength stability and the output level monitoring of laser signals taken out from the output side slab-waveguide of the arrayed waveguide grating become important. As shown in FIG. 23, to meet this demand output monitoring controllers $431_1$ to $431_N$ and $431_S$ are provided in correspondence to the modes $411_1$ to $411_M$ and the optical transmitter 401.

As has been described in the foregoing, according to the first to third and ninth to twenty seventh aspects of the present invention, the higher order diffraction beam signals other than the 0-th order obtained from the signals inputted to the output side slab-waveguide of the arrayed waveguide grating are used for monitoring. Thus, compared to the method of obtaining the monitor signals by demultiplexing the intrinsic wavelength multiplexed signals, not only such demultiplexing means is necessary, but also the signal level of the intrinsic multiplexed signal is not reduced because no demultiplexing is done. Besides, since the higher order diffraction beams are used, it is possible to obtain accurate monitoring.

Also, according to the fourth to eighth aspects of the present inventions, the higher order diffraction beams other than the 0-th order obtained from the signals inputted to the slab-waveguide of the arrayed waveguide grating of the optical transmission system. Thus, compared to the method of obtaining the monitor signals by demultiplexing the intrinsic wavelength multiplexed signal, such demultiplexing means is unnecessary. It is thus possible to reduce the cost and size of the optical communication system. Besides, since the intrinsic signal is not demultiplexed, the signal level is not reduced. Furthermore, since the higher order diffraction beams are used, it is possible to obtain accurate monitoring.

Furthermore, according to the twenty-eighth to thirty-first aspects of the present inventions, the higher order diffraction beams other than the 0-th obtained from the signals inputted to the slab-waveguide of the arrayed waveguide grating of the optical communication system are used for monitoring. Thus, compared to the method of obtaining the monitor signals by demultiplexing the intrinsic wavelength multiplexed signal, such demultiplexing means is unnecessary. It is thus possible to reduce the cost and size of the entire optical communication system. Besides, since the intrinsic signal is not demultiplexed, the signal level is not reduced. Furthermore, since the higher order diffraction beams are used, it is possible to obtain accurate monitoring.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An arrayed waveguide grating having a slab-waveguide, the slab-waveguide comprising:

a plurality of input ports for inputting signals of different wavelengths in correspondence to these wavelengths;

an output port disposed on a focus position of 0-th order diffraction beams inputted from the input ports for outputting a signal obtained as a result of multiplexing of the individual wavelengths; and a monitor signal port disposed on a focus position of higher order diffraction beams other than the 0-th order diffraction beams obtained from the signals inputted from the plurality of input ports for monitoring the multiplexed signal.

2. An arrayed waveguide grating having a slab-waveguide, the slab-waveguide comprising:

a plurality of input ports for inputting signals of different wavelengths in correspondence to these wavelengths;

an output port disposed on the focus position of the 0-th order diffraction beams inputted from the input ports for outputting a signal obtained as a result of multiplexing of the individual wavelengths; and a higher order diffraction beam reflecting means disposed on the focus position of higher order diffraction beams other than the 0-th order obtained from the signals inputted from the input ports for reflecting the higher order diffraction beams to the side of the plurality of input ports.

3. An arrayed waveguide grating having a slab-waveguide, the slab-waveguide comprising:

a plurality of input ports for inputting signals of different wavelengths in correspondence to these wavelengths;

an output port disposed on the focus position of the 0-th order diffraction beams inputted from the input ports for outputting a signal obtained as a result of multiplexing of the individual wavelengths;

a higher order diffraction beam reflecting means disposed on the focus position of higher order diffraction beams other than the 0-th order obtained from the signals inputted from the input ports for reflecting the higher order diffraction beams to the side of the plurality of input ports; and at least one monitor signal port disposed at a position or positions other than the plurality of input ports for taking out a signal or signals reflected from the higher order diffraction beam reflecting means.

4. An optical transmission system comprising:

a plurality of signal sources each provided for each individual wavelength;

an input waveguide for inputting signals of different wavelengths from these signal sources in correspondence to these wavelengths;

a channel waveguide array comprising waveguides with lengths progressively increasing by a predetermined waveguide length difference;

an input side slab-waveguide inter-connecting the input side of the channel waveguide array and the input waveguide; and an output side slab-waveguide which comprises:

output ports inter-connecting to the output side of the channel waveguide array and disposed at the focus position of the 0-th order diffraction beams inputted from the input waveguides through the input side slab-waveguide and the channel waveguide array for outputting a wavelength multiplexed signal;

an output waveguide connected to the output port for outputting the multiplexed signal to be transmitted;

a monitor signal separating means for demultiplexing, by using the channel waveguide array, the multiplexed signal obtained in the output side slab-waveguide at the focus position of higher order diffraction beams other than the 0-th order obtained from the signals from the input waveguide, thereby separating the monitor signals of wavelengths corresponding to those of the signals inputted from the input waveguides;

an output level detecting means for detecting, from the signals of different wavelengths obtained from the monitor signal separating means, the output levels of the individual wavelength signals from the plurality of signal sources; and a signal source power control means for controlling the power levels of the plurality of signal sources according to the output levels of the individual wavelength signals from the plurality of signal sources as detected by the output level detecting means.

5. An optical transmission system comprising:

a plurality of signal sources each provided for each individual wavelength;

an input waveguide for inputting signals of different wavelengths from these signal sources in correspondence to these wavelengths;

a channel waveguide array having waveguides with lengths progressively increasing by a predetermined waveguide length difference;

an input side slab-waveguide inter-connecting the input side of the channel waveguide array and the input waveguide;

an output side slab-waveguide comprising:

an output port connected to the output side of the channel waveguide array and disposed at the focus position of the 0-th order diffraction beams inputted from the input waveguides through the input side slab-waveguide and the channel waveguide array for outputting a wavelength multiplexed signal; and a monitor signal port disposed at the focus position of higher order diffraction beams other than the 0-th order obtained from the signals inputted from the input waveguide;

an output waveguide connected to the output port for outputting the multiplexed signal to be transmitted;

a monitor signal separating means for demultiplexing, by using the channel waveguide array, the individual wavelength monitor signals from the wavelength multiplexed signal obtained from the monitor port;

an output level detecting means for detecting, from the signals of individual wavelengths obtained from the monitor signal separating means, the output levels of the individual wavelength signals from the plurality of signal sources; and a signal source power control means for controlling the power levels of the plurality of signal sources according to the output levels of the individual wavelength signals from the plurality of signal sources as detected by the output level detecting means.

6. An optical transmission system comprising:

an input waveguide for inputting signals of different wavelengths in correspondence to these wavelengths;

a channel waveguide array comprising waveguides with lengths progressively increasing by a predetermined waveguide length difference;

an input side slab-waveguide inter-connecting the input side of the channel waveguide array and the input waveguide;

an output side slab-waveguide including an output port connected to the output side of the channel waveguide array and disposed at the focus position of the 0-th order diffraction beams inputted from the input waveguides through the input side slab-waveguide and the channel waveguide array for outputting a wavelength multiplexed signal;

an output waveguide connected to the output port for outputting the multiplexed signal to be transmitted;

a monitor signal separating means for demultiplexing or separating, by using the channel waveguide array, the multiplexed signal obtained at the focus position of higher order diffraction beam other than 0-th order of the multiplexed signals inputted from the input waveguide in the output slab-waveguide to obtain the individual wavelength monitor signal signals;

an output level detecting means for detecting, from the signals of individual wavelengths obtained from the monitor signal separating means, the output levels of the individual wavelength; and a signal incidence level control means for controlling the incidence levels of the individual wavelength signal signals incident on the plurality of input waveguides according to the output levels of the individual wavelength signals as detected by the output level detecting means.

7. An optical transmission system comprising:

a plurality of input waveguides for inputting signals of different wavelengths in correspondence to these wavelengths;

a channel waveguide array comprising waveguides with lengths progressively increasing by a predetermined waveguide length difference;

an input side slab-waveguide inter-connecting the input side of the channel waveguide array and the input waveguide;

an output side slab-waveguide comprising:

an output port connected to the output side of the channel waveguide array and disposed at the focus position of the 0-th order diffraction beams inputted from the input waveguides through the input side slab-waveguide and the channel waveguide array for outputting a wavelength multiplexed signal and a monitor signal port disposed at the focus position of higher order diffraction beams other than the 0-th order obtained from the signal inputted from the input waveguide;

an output waveguide connected to the output port for outputting the multiplexed signal to be transmitted;

a monitor signal separating means for demultiplexing or separating, by using the channel waveguide array, the wavelength multiplexed signal obtained from the monitor port to obtain the individual wavelength monitor outputs;

an output level detecting means for detecting, from the signals of individual wavelengths obtained from the monitor signal. separating means, the output levels of the individual wavelength; and a signal incidence control means for controlling the incidence levels of the individual wavelength signals incident on the plurality of input waveguides according to the output levels of the individual wavelength signals as detected by the output level detecting means.

8. An optical transmission system comprising:

an input waveguides for inputting signals of different wavelengths in correspondence to these wavelengths;

a channel waveguide array comprising waveguides with lengths progressively increasing by a predetermined waveguide length difference;

an input side slab-waveguide inter-connecting the input side of the channel waveguide array and the input waveguide;

an output side slab-waveguide, comprising:

an output port connected to the output side of the channel waveguide array and disposed at the focus position of the 0-th order diffraction beams inputted from the input waveguides through the input side slab-waveguide and the channel waveguide array for outputting a wavelength multiplexed signal;

an output waveguide connected to the output port for outputting the multiplexed signal to be transmitted; and a monitor signal separating means for demultiplexing or separating, by using the channel waveguide array, the multiplexed signal obtained at the focus position of higher order diffraction beam other than 0-th order of the multiplexed signals inputted from the input waveguide in the output slab-waveguide to obtain the individual wavelength monitor signal outputs.

9. An arrayed waveguide grating comprising:

an input waveguides for inputting signals of different wavelengths in correspondence to these wavelengths;

a channel waveguide array comprising waveguides with lengths progressively increasing by a predetermined waveguide length difference;

an input side slab-waveguide inter-connecting the input side of the channel waveguide array and the input waveguides comprising:

monitor signal ports for monitoring signals returning from the channel waveguide array;

an output side slab-waveguide comprising:

an output port connected to the output side of the channel waveguide array and disposed at the focus position of the 0-th order diffraction beams inputted from the input waveguides through the input side slab-waveguide and the channel waveguide array for outputting a wavelength multiplexed signal and a signal returning means for causing a signal converged on the focus position of higher order diffraction beams other than the 0-th order obtained from the signals inputted from the input waveguides to return from the focus position to the input side; and an output waveguide connected to the output port for obtaining the multiplexed signal.

10. The arrayed waveguide grating according to claim 9, wherein the signal returning means comprises:

a reflecting means disposed at the focus position of higher order diffraction beams other than the 0-th order obtained from the signals inputted from the input waveguides for reflecting the higher order diffraction beams to the side of the plurality of input waveguides.

11. An arrayed waveguide grating comprising:

a substrate;

input waveguides disposed on the substrate for inputting signals of individual wavelengths in correspondence thereto;

a channel waveguide grating disposed on the substrate and having waveguides with lengths progressively increasing by a predetermined waveguide length difference;

an input side slab-waveguide disposed on the substrate and inter-connecting the input side of the channel waveguide array and the input waveguides;

an output side slab-waveguide connected to the output side of the channel waveguide array and disposed at the focus position of the 0-th diffraction beams obtained from the signals inputted from the input waveguides through the input side slab-waveguide and the channel waveguide array for outputting a wavelength multiplexed signal; and a monitor signal port disposed at the focus position of higher order diffraction beams other than the 0-th order obtained from the signals inputted from the input waveguides;

an output waveguide connected to the output port;

a waveguide disposed on the substrate comprising:
  a first terminal connected to the monitor signal port of the output side slab-waveguide; and
  a second terminal disposed on the inner side of one end face of the substrate; and a reflecting means disposed at the second terminal of the waveguide for reflecting the signal led out from the monitor signal port.

12. An arrayed waveguide grating comprising:

a substrate;

input waveguides disposed on the substrate for inputting signals of individual wavelengths in correspondence thereto;

a channel waveguide grating disposed on the substrate and having waveguides with lengths progressively increasing by a predetermined waveguide length difference;

an input side slab-waveguide disposed on the substrate and inter-connecting the input side of the channel waveguide array and the input waveguides;

an output side slab-waveguide connected to the output side of the channel waveguide array comprising:
  a wavelength multiplexed signal output port disposed at the focus position of the 0-th diffracted signals obtained from the signals inputted from the input waveguides through the input side slab-waveguide and the channel waveguide array;
  a monitor signal output port disposed at the focus position of the higher order diffraction beams other than the 0-th order diffraction beams obtained from the signals inputted from the input waveguides; and
  a monitor signal input port for outputting an output from a predetermined path, through which the signal outputted from the monitor signal output port returns, toward the side of the plurality of input waveguides;

an output waveguide connected to the output port; and a waveguide disposed on the substrate and optically connecting the monitor signal output port and monitor signal input port.

13. An arrayed waveguide grating comprising:

a substrate;

input waveguides disposed on the substrate for inputting signals of individual wavelengths in correspondence thereto;

a channel waveguide grating disposed on the substrate comprising waveguides with lengths progressively increasing by a predetermined waveguide length difference;

an input side slab-waveguide disposed on the substrate and inter-connecting the input side of the channel waveguide array and the input waveguides;

an output side slab-waveguide connected to the output side of the channel waveguide array comprising:
  a wavelength multiplexed signal output port disposed at the focus position of the 0-th diffracted signals obtained from the signals inputted from the input waveguides through the input side slab-waveguide and the channel waveguide array; and
  a monitor signal port disposed at the focus position of the higher order diffraction beams other than the 0-th order diffraction beams obtained from the signals inputted from the input waveguides;

an output waveguide connected to the output port;

a waveguide disposed on the substrate comprising:
  a first terminal connected to the monitor signal port of the output side slab-waveguide; and
  a second terminal disposed on one end face of the substrate; and a reflecting means disposed on the other terminal of the waveguide for reflecting the signal led out from the monitor signal port.

14. An arrayed waveguide grating comprising:

a substrate;

input waveguides disposed on the substrate for inputting signals of individual wavelengths in correspondence thereto;

a channel waveguide grating disposed on the substrate comprising waveguides with lengths progressively increasing by a predetermined waveguide length difference;

an input side slab-waveguide disposed on the substrate and inter-connecting the input side of the channel waveguide array and the input waveguides;

an output side slab-waveguide connected to the output side of the channel waveguide array comprising:
  a wavelength multiplexed signal output port disposed at the focus position of the 0-th diffracted signals obtained from the signals inputted from the input waveguides through the input side slab-waveguide and the channel waveguide array;
  a monitor signal output port disposed at the focus position of the higher order diffraction beams other than the 0-th order diffraction beams obtained from the signals inputted from the input waveguides; and
  a monitor signal input port for outputting an output from a predetermined path, through which the signal outputted from the monitor signal output port returns, toward the side of the plurality of input waveguides;

a monitor signal output waveguide disposed on the substrate comprising:
  a first terminal connected to the monitor signal port of the output side slab-waveguide; and
  a second terminal disposed on one end face of the substrate;

a monitor signal input waveguide disposed on the substrate comprising:
  a first terminal connected to the monitor signal input port in the output side slab-waveguide; and
  a second terminal disposed at a position other than the afore-mentioned predetermined position on the end face of the substrate; and an optical fiber for optically inter-connecting the monitor signal output waveguide at one end of the substrate and the corresponding terminal of the monitor signal input waveguide.

15. An arrayed waveguide grating comprising:

a substrate;

input waveguides disposed on the substrate for inputting signals of individual wavelengths in correspondence thereto;

a channel waveguide grating disposed on the substrate comprising waveguides with lengths progressively increasing by a predetermined waveguide length difference;

an input side slab-waveguide disposed on the substrate and inter-connecting the input side of the channel waveguide array and the input waveguides;

an output side slab-waveguide connected to the output side of the channel waveguide array comprising:
  a wavelength multiplexed signal output port disposed at the focus position of the 0-th diffracted signals obtained from the signals inputted from the input waveguides through the input side slab-waveguide and the channel waveguide array; and
  a monitor signal port disposed at the focus position of the higher order diffraction beams other than the 0-th order diffraction beams obtained from the signals inputted from the input waveguides;

an output waveguide disposed on the substrate comprising:
  a first terminal connected to the monitor signal port of the output side slab-waveguide; and
  a second terminal disposed on an end face of the substrate;

an optical fiber comprising:
  a first terminal connected to the afore-mentioned second terminal of the output waveguide located on the end face of the substrate; and a reflecting means connected to a second terminal of the optical fiber for reflecting the signal led out from that other terminal.

16. An arrayed waveguide grating comprising:

input waveguides for inputting signals of individual wavelengths in correspondence to these wavelengths;

a channel waveguide array comprising waveguides with lengths progressively increasing by a predetermined waveguide length difference;

a feedback waveguide for feeding back a multiplexed monitor signal;

an input side slab-waveguide, in which the input waveguides and the feedback waveguide are disposed and the input side of the channel waveguide array is disposed on the output side;

an output side slab-waveguide connected to the output side of the channel waveguide array comprising:
  an output port disposed on the focus position of the 0-th diffraction beams obtained from the signal inputted from the input waveguides through the input side slab-waveguide and the channel waveguide array for outputting the wavelength multiplexed signal;
  a feedback port disposed at the focus position of higher order diffraction beams other than the 0-th order obtained from the signals inputted from the input waveguides; and
  at least one monitor signal port for outputting monitor signals separated from the multiplexed signal inputted from the feedback waveguide through the channel waveguide array;

an output waveguide connected to the output port of the output side slab-waveguide; and monitor signal output waveguide connected to the monitor signal port.

17. An arrayed waveguide grating comprising:

input waveguides for inputting signals of individual wavelengths in correspondence to these wavelengths;

a channel waveguide array comprising waveguides with lengths progressively increasing by a predetermined waveguide length difference;

a feedback fiber for feeding back a multiplexed signal monitor signal;

an input side slab-waveguide, in which the input waveguides and the feedback fiber are disposed on one side and the input side of the channel waveguide array is disposed on the output side;

an output side slab-waveguide connected to the output side of the channel waveguide array comprising:
  an output port disposed on the focus position of the 0-th diffraction beams obtained from the signal is inputted from the input waveguides through the input side slab-waveguide and the channel waveguide array for outputting the wavelength multiplexed signal;
  a feedback port disposed at the focus position of higher order diffraction beams other than the 0-th order obtained from the signals inputted from the input waveguides; and
  at least one monitor signal ports for outputting monitor signals separated from the multiplexed signal inputted from the feedback fiber through the channel waveguide array;

an output waveguide connected to the output port of the output side slab-waveguide; and monitor signal output waveguide connected to the monitor signal port.

18. An arrayed waveguide grating comprising:

input waveguides for inputting signals of individual wavelengths in correspondence to these wavelengths;

monitor waveguides disposed at positions individual from the input waveguides for outputting monitor signals;

a channel waveguide array comprising waveguides with lengths progressively increasing by a predetermined waveguide length difference;

an output side slab-waveguide connected to the output side of the channel waveguide array and including a signal returning means for causing a signal converged on the focus position of higher order diffraction beams other than the 0-th order obtained from the signals inputted from the input waveguides through the input side slab-waveguide and the channel waveguide array;

an input side slab-waveguide inter-connecting the input waveguides, the input side of the channel waveguide array and the monitor waveguides for outputting the signal inputted from the output side slab-waveguide through the channel waveguide array to the monitor signal waveguide;

an output port disposed on the output side slab-waveguide at the focus position of the 0-th diffraction beams obtained from the signal inputted from the input waveguides for outputting the wavelength multiplexed signal; and an output waveguide connected to the output port.

19. The arrayed waveguide grating according to claim 18, wherein the monitor waveguide is disposed at the focus position of the 0-th order diffraction beams obtained from the signals returning from the output side slab-waveguide to the input side slab-waveguide, and the focus positions of the 1-st order diffraction beams are disposed at positions mid way between adjacent ones of the input waveguides.

20. The arrayed waveguide grating according to claim 18, wherein the monitor waveguides are disposed alternately with the input waveguides at the input side slab-waveguide.

21. The arrayed waveguide grating according to claim 18, wherein the input positions of the input side slab-waveguide corresponding to the individual wavelengths of the inputs inputted to the input waveguides are disposed mid way between the 0-th and 1-st diffraction beams returning from the channel waveguide array.

22. The arrayed waveguide grating according to claim 18, wherein a region covering the positions of the monitor signal ports in the input side slab-waveguide is set such that it does not overlap but is separate from a region covering the positions of the input ports.

23. The arrayed waveguide grating according to claim 18, wherein the signal returning means comprises:
 a higher order diffraction beam reflecting mirror disposed in the output side slab-waveguide at the focus position of the higher order diffraction beams; and
 a signal returning mirror disposed at a position other than the position of the higher order diffraction beam reflecting mirror and the focus position of the 0-th order diffraction beams for returning the signals reflected by the higher order diffraction beam mirror to the input slab-waveguide side.

24. The arrayed waveguide grating according to claim 18, wherein the signal returning means comprises:
 a signal returning mirror disposed in the output side slab-waveguide at the focus position of the higher order diffraction beams for returning the higher order diffraction beams incident on that position along a path at a signal angle from the optical axis to the input slab-waveguide side.

25. The arrayed waveguide grating according to claim 18, wherein the signal returning means comprises:
 a mirror disposed on one end face of a substrate with the output side slab-waveguide;
  a first monitor signal waveguide for leading the signal converged on the focus position of the higher order diffraction beams to the afore-mentioned mirror; and
  a second monitor signal waveguide, which causes the signal reflected by the afore-mentioned mirror to be inputted to the output side slab-waveguide from a position thereof other than the output port and thereof the focus position of the higher order diffraction beams other than the 0-th order for being outputted to the input slab-waveguide side.

26. The arrayed waveguide grating according to claim 18, wherein the signal returning means comprises a monitor signal waveguide, which the signal converged on the focus position of the higher order diffraction beams is inputted to and causes the inputted to be inputted to the output side slab-waveguide from a position thereof other than the output port and thereof the focus position of the higher order diffraction beams for being outputted to the input slab-waveguide side.

27. The arrayed waveguide grating according to claim 18, wherein the signal returning means comprises an optical fiber, which the signal converged on the focus position of the higher order diffraction beams is inputted to and causes the input to be inputted to the output side slab-waveguide from a position thereof other than the output port and thereof the focus position of the higher order diffractions beams for being outputted to the input slab-waveguide side.

28. An optical communication system comprising:
 an optical communication means for outputting signal signals of individual wavelengths as parallel signals;
 a multiplexer comprising an arrayed waveguide grating for wavelength multiplexing the signals of the individual wavelengths outputted from the optical communication means;
 an optical transmission path for transmitting the wavelength multiplexed signal outputted from the multiplexer;
 a node provided on the optical transmission path comprising an arrayed waveguide grating;
 a demultiplexer comprising an arrayed waveguide grating for separating the individual wavelength signals from the signal inputted through the optical transmission path and the node thereon; and
 an optical reception means for receiving the individual wave signals separated by the multiplexer,
 the multiplexer comprising:
  a plurality of input waveguides for inputting signals of individual wavelengths in correspondence to these wavelengths; and
  a slab-waveguide having a wavelength multiplexed signal output port disposed at the focus position of the 0-th order diffraction beams of the signals inputted from the input waveguides through an input side slab-waveguide and a channel waveguide array and monitor signal port disposed at the focus position of higher order diffraction beams other than the 0-th order obtained from the signals inputted from the input waveguides or monitoring the wavelength multiplexed signal.

29. An optical transmission system comprising a transmission path loop comprising a plurality of nodes connected to one another by transmission paths such that a wavelength multiplexed signal is sent out to these transmission paths,
 the nodes each comprising:
  a first arrayed waveguide grating for separating signals of individual wavelengths from the inputted wavelength multiplexed signals; and
  a second arrayed wavelength waveguide grating for waveguide wavelength multiplexing the separated signal signals of the individual wavelengths,
 the second arrayed waveguide grating comprising:
  a plurality of input waveguides for inputting signals of individual wavelengths in correspondence to these signals; and
  a slab-waveguide comprising:
   a wavelength multiplexed signal output port disposed at the focus position of the 0-th diffraction beams obtained from the signals inputted from the input waveguides through an input side slab-waveguide; and
   a channel waveguide array and a monitor signal port disposed at the focus position of higher order diffraction beams other than the 0-th order obtained from the signals inputted from the input waveguides for monitoring the wavelength multiplexed signal.

30. An optical communication system comprising:
 an optical communication means for outputting signal signals of individual wavelengths as parallel signals;
 a multiplexer constituted by an arrayed waveguide grating for wavelength multiplexing the individual wavelength signals outputted from the optical communication means;
 an optical transmission path for transmitting the wavelength multiplexed signal outputted from the multiplexer;

a node disposed on the optical transmission path comprising an arrayed waveguide grating; and a demultiplexer for demultiplexing the signal inputted thereto along the optical transmission path and on the node thereon to separate the individual wavelength signals;

an optical reception means for receiving the separated individual wavelength signals from the demultiplexer, the demultiplexer comprising:
- a plurality of input waveguides; and
- a slab waveguide comprising:
  - a wavelength multiplexed signal output port disposed at the focus position of the 0-th order diffraction signals inputted from the input waveguides through an input side slab-waveguide and a channel waveguide array;
  - a higher order diffraction beam reflecting means disposed at the focus position of higher order diffraction beam positions other than the 0-th order obtained from the signals inputted from the input waveguides for reflecting the higher order diffraction beams to the side of the plurality of input waveguides; and
  - at least one monitor signal port disposed at a position or positions other than the ports of the plurality of input waveguides for inputting a signal or signals reflected by the higher order signal reflecting means.

31. An optical communication system comprising:

a transmission path loop comprising a plurality of nodes connected to one another by transmission paths such that a wavelength multiplexed signal is sent out to these transmission paths, the nodes each comprising:
- a first arrayed waveguide grating for separating signals of individual wavelengths from the inputted wavelength multiplexed signal; and
- a second arrayed wavelength waveguide grating for waveguide wavelength multiplexing the separated signal signals of the individual wavelengths, the second arrayed waveguide grating comprising:
- a slab-waveguide which comprises:
  - a plurality of input waveguides for inputting signals of individual wavelengths in correspondence to these signals;
  - a multiplexed signal output port disposed at the focus position of the 0-th diffraction beams obtained from the signals inputted from the input waveguides through an input side slab-waveguide and a channel waveguide array;
  - a higher order diffraction beam reflecting means for reflecting the higher order diffraction beams to the side of the plurality of input waveguides,
  - a plurality of monitor signal ports disposed at positions other than the port positions of the plurality of input waveguides for inputting the signals reflected by the higher order diffraction beams; and
  - a monitor signal port disposed at the focus position of higher order diffraction beams other than the 0-th order obtained from the signals inputted from the input waveguides for monitoring the wavelength multiplexed signal.

32. The arrayed waveguide according to claim 1, further comprising:
- a signal returning means disposed on a focus position of the higher order diffraction beam other than the 0-th order diffraction beam.

33. The arrayed waveguide grating according to claim 32, wherein said signal returning means comprises:
- a higher order diffraction beam reflecting means disposed on the focus position of higher order diffraction beams other than the 0-th order diffraction beam obtained from the signals inputted from the input ports for reflecting the higher order diffraction beams to the side of the plurality of input ports.

34. The arrayed waveguide grating according to claim 2, wherein said slab-waveguide further comprises:
- at least one monitor signal port.

35. The arrayed waveguide grating according to claim 34, wherein said at least one monitor signal port comprises:
- a monitor signal port disposed on a focus position of higher order diffraction beams other than the 0-th order diffraction beam obtained from the signals inputted from the input ports for monitoring the multiplexed signal.

36. The arrayed waveguide grating according to claim 34, wherein said at least one monitor signal port comprises:
- at least one monitor signal port disposed at positions other than the plurality of input ports for taking out at least one signal reflected from the higher order diffraction beam reflecting means.

37. The arrayed waveguide grating according to claim 34, wherein said at least one monitor signal port comprises:
- at least one monitor signal port disposed at positions corresponding to the plurality of input ports for taking out at least one signal reflected from the higher order diffraction beam reflecting means.

38. The arrayed waveguide grating according to claim 2, wherein said higher order diffraction beam reflecting means comprises:
- at least one reflecting minor disposed such that the reflecting surfaces of said at least one reflecting mirror face said input ports.

39. The arrayed waveguide grating according to claim 38, wherein said at least one reflecting mirror comprises:
- a first reflecting mirror; and
- a second reflecting mirror.

40. An arrayed waveguide grating comprising:
- an input side slab-waveguide interconnecting a plurality of input waveguides and having monitor signal ports for monitoring signals returning to said input side slab-waveguide; and
- an output side slab-waveguide comprising an output port disposed at the focus position of the 0-th order diffraction beams inputted from the input waveguides through said input side slab-waveguide for outputting a wavelength multiplexed signal.

* * * * *